(12) United States Patent
Fastow et al.

(10) Patent No.: US 8,924,453 B2
(45) Date of Patent: Dec. 30, 2014

(54) ARITHMETIC LOGIC UNIT ARCHITECTURE

(75) Inventors: Richard Fastow, Cupertino, CA (US); Jens Olson, Saratoga, CA (US); Ben Michael Shoham, Ramat Hasharon (IL)

(73) Assignee: Spansion LLC, Sunnyvale, CA (US)

( * ) Notice: Subject to any disclaimer, the term of this patent is extended or adjusted under 35 U.S.C. 154(b) by 279 days.

(21) Appl. No.: 13/490,129

(22) Filed: Jun. 6, 2012

(65) Prior Publication Data

US 2013/0159371 A1    Jun. 20, 2013

Related U.S. Application Data

(60) Provisional application No. 61/577,595, filed on Dec. 19, 2011, provisional application No. 61/589,113, filed on Jan. 20, 2012.

(51) Int. Cl.
*G06F 7/38* (2006.01)
*G10L 15/187* (2013.01)
*G10L 15/28* (2013.01)
*G06F 17/10* (2006.01)
*G10L 15/14* (2006.01)
*G10L 15/02* (2006.01)

(52) U.S. Cl.
CPC .............. *G06F 17/10* (2013.01); *G10L 15/187* (2013.01); *G10L 15/28* (2013.01); *G10L 15/14* (2013.01); *G10L 15/02* (2013.01)
USPC ........................................................ 708/490

(58) Field of Classification Search
CPC ........... G06F 7/5443; G06F 7/57; G06F 7/48; G06F 9/3001; G06F 2207/3828
USPC ......................................................... 708/490
See application file for complete search history.

(56) References Cited

U.S. PATENT DOCUMENTS

| 5,604,839 | A |  | 2/1997 | Acero et al. |
| 7,454,341 | B1 |  | 11/2008 | Pan et al. |
| 2003/0097263 | A1 | * | 5/2003 | Lee ................................ 704/236 |
| 2007/0083371 | A1 | * | 4/2007 | Jeong et al. .................... 704/256 |
| 2007/0237215 | A1 | * | 10/2007 | Sartor ............................ 375/224 |

FOREIGN PATENT DOCUMENTS

KR    10-0764247 B1    10/2007

OTHER PUBLICATIONS

International Search Report and the Written Opinion of the International Searching Authority for International Application No. PCT/US2012/070332, mailed Apr. 30, 2013.

(Continued)

*Primary Examiner* — Tan V. Mai
(74) *Attorney, Agent, or Firm* — Sterne, Kessler, Goldstein & Fox P.L.L.C.

(57) ABSTRACT

Embodiments of the present invention include an apparatus, method, and system for acoustic modeling. In an embodiment, an arithmetic logic unit for computing a one-dimensional score between a feature vector and a Gaussian probability distribution vector is provided. The arithmetic logic unit includes a computational logic unit configured to compute a first value based on a mean value and a variance value associated with a dimension of the Gaussian probability distribution vector and a dimension of a feature vector, a look up table module configured to output a second value based on the variance value, and a combination module configured to combine the first value and the second value to generate the one-dimensional score.

17 Claims, 28 Drawing Sheets

(56) References Cited

OTHER PUBLICATIONS

Gupta, K., "Design & implementation of a co-processor for embedded, real-time, speaker-independent, continuous speech recognition system-on-a-chip," MS Dissertation, University of Pittsburgh, 2006.

Park, J., et al., "Achieving a reliable compact acoustic model for embedded speech recognition system with high confusion frequency model handling," *Speech Communitation*:48(6), 737-745, 2006.

* cited by examiner

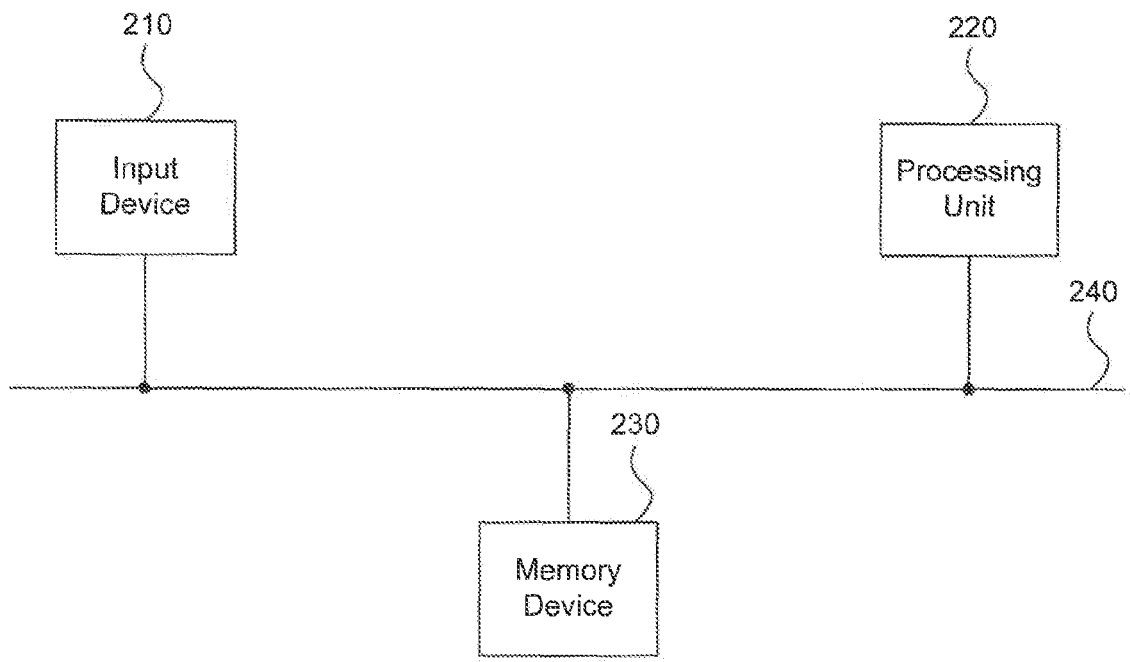
FIG. 2
(Conventional)

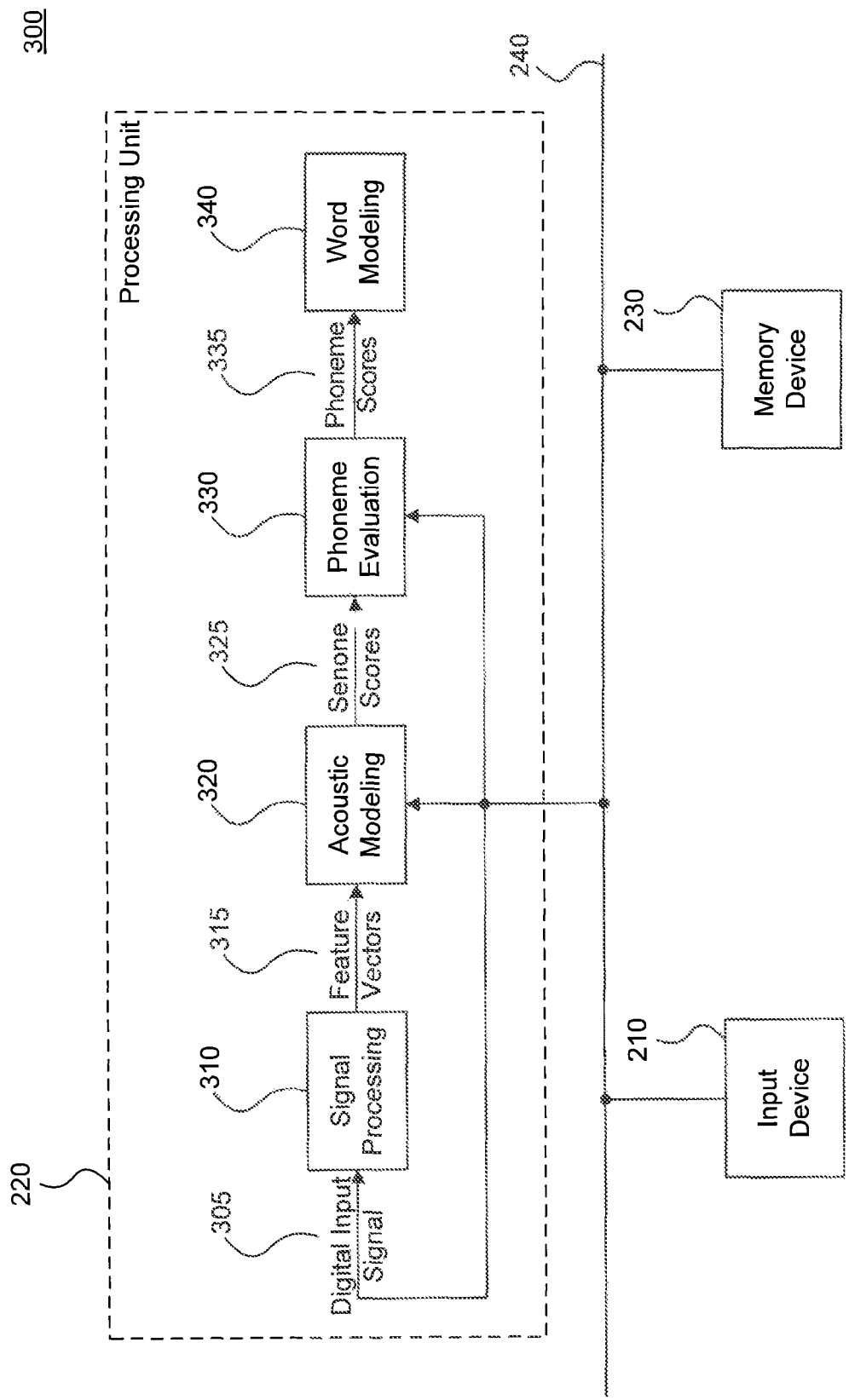
FIG. 3
(Conventional)

US 8,924,453 B2

ARITHMETIC LOGIC UNIT ARCHITECTURE

CROSS-REFERENCE TO RELATED APPLICATION

This application claims the benefit of U.S. Provisional Patent Application No. 61/577,595, filed Dec. 19, 2011, titled "Senone Scoring Unit" and U.S. Provisional Patent Application No. 61/589,113, filed Jan. 20, 2012, titled "HW/SW Architecture for Speech Recognition," both of which are incorporated herein by reference in their entireties.

BACKGROUND

1. Field

Embodiments of the present invention generally relate to speech recognition. More particular, embodiments of the present invention relate to the implementation of an acoustic modeling process on a dedicated processing unit.

2. Background

Real-time data pattern recognition is increasingly used to analyze data streams in electronic systems. On a vocabulary with over tens of thousands of words, speech recognition systems have achieved improved accuracy, making it an attractive feature for electronic systems. For example, speech recognition systems are increasingly common in consumer markets targeted to data pattern recognition applications such as, for example, the mobile device, server, automobile, and PC markets.

Despite the improved accuracy in speech recognition systems, significant computing resources are dedicated to the speech recognition process, in turn placing a significant load on computing systems such as, for example, multiuser/multiprogramming environments. Multiprogramming computing systems concurrently process data from various applications and, as a result, the load placed on these computing systems by the speech recognition process affects the speed at which the computing systems can process incoming voice signals as well as data from other applications. Further, for handheld devices that typically include limited memory resources (as compared to desktop computing systems), speech recognition applications not only place significant load on the handheld device's computing resources but also consume a significant portion of the handheld device's memory resources. The above speech recognition system issues of processing capability, speed, and memory resources are further exacerbated by the need to process incoming voice signals in real-time or substantially close to real-time.

SUMMARY

Therefore, there is a need to improve the load that speech recognition systems place on the processing capability, speed, and memory resources of computing systems.

In an embodiment, an arithmetic logic unit for computing a one-dimensional score between a feature vector and a Gaussian probability distribution vector is provided. The arithmetic logic unit includes a computational logic unit configured to compute a first value based on a mean value and a variance value associated with a dimension of the Gaussian probability distribution vector and a dimension of a feature vector, a look up table module configured to output a second value based on the variance value, and a combination module configured to combine the first value and the second value to generate the one-dimensional score.

Another embodiment of the present invention includes a method of computing a one-dimensional distance score between a feature vector and a Gaussian probability distribution vector. The method includes computing a first value based on a mean value and a variance value associated with a dimension of the Gaussian probability distribution vector and a dimension of a feature vector, retrieving a second value based on the variance value from a look up table module, and combining the first value and the second value to generate the one-dimensional score.

Further features and advantages of embodiments of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 2 is an illustration of a conventional speech recognition system.

FIG. 3 is an illustration of a conventional speech recognition system with speech recognition processes performed by an individual processing unit

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the scope of the invention. Rather, the scope of the invention is defined by the appended claims.

It would be apparent to a person skilled in the relevant art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

This specification discloses one or more embodiments that incorporate the features of this invention. The disclosed embodiments merely exemplify the invention. The scope of the invention is not limited to the disclosed embodiments. The invention is defined by the claims appended hereto.

The embodiments described, and references in the specification to "one embodiment", "an embodiment", "an example embodiment", etc., indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

1. Speech Recognition Process

Figure 1:
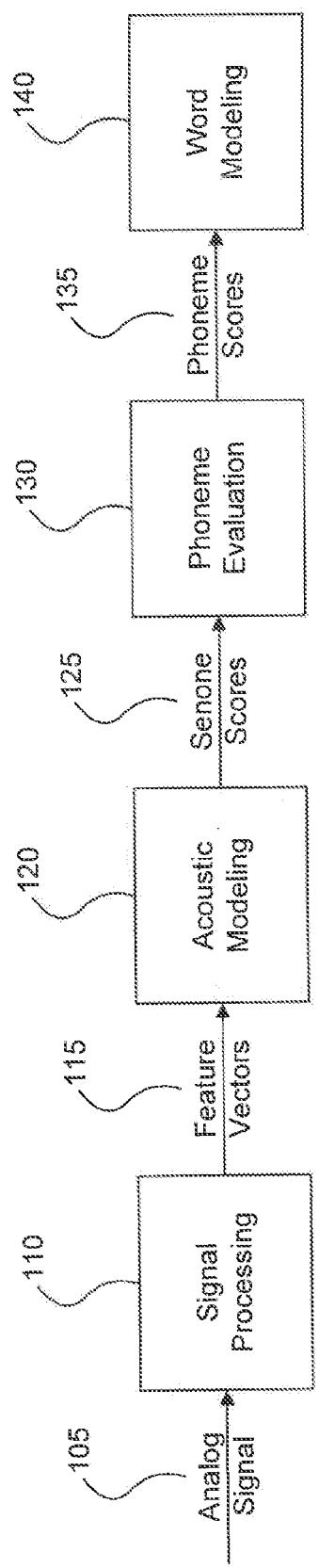
FIG. 1 is an illustration of an exemplary flowchart of a speech recognition process according to an embodiment of the present invention.

FIG. 1 is an illustration of an exemplary flowchart of a speech recognition process 100 according to an embodiment of the present invention. Speech recognition process 100 includes a signal processing stage 110, an acoustic modeling stage 120, a phoneme evaluation stage 130, and a word modeling stage 140.

In signal processing stage 110, an analog signal representation of an incoming voice signal 105 can be filtered to eliminate high frequency components of the signal that lie outside the range of frequencies that the human ear can hear. The filtered signal is then digitized using sampling and quantization techniques well known to a person skilled in the relevant art. One or more parametric digital representations (also referred to herein as "feature vectors 115") can be extracted from the digitized waveform using techniques such as, for example, linear predictive coding and fast fourier transforms. This extraction can occur at regular time intervals, or frames, of approximately 10 ms, for example.

In acoustic modeling stage 120, feature vectors 115 from signal processing stage 110 are compared to one or more multivariate Gaussian probability distributions (also referred to herein as "Gaussian probability distributions") stored in memory. The one or more Gaussian probability distributions stored in memory can be part of an acoustic library, in which the Gaussian probability distributions represent senones. A senone refers to a sub-phonetic unit for a language of interest, as would be understood by a person skilled in the relevant art. An individual senone can be made up of, for example, 8 components, in which each of the components can represent a 39-dimension Gaussian probability distribution.

Acoustic modeling stage 120 can process over 1000 senones, for example. As a result, the comparison of feature vectors 115 to the one or more Gaussian probability distributions can be a computationally-intensive task, as thousands of Gaussian probability distributions, for example, can be compared to feature vectors 115 every time interval or frame (e.g., 10 ms). A set of scores for each of the senones represented in the acoustic library (also referred to herein as "senone scores") results from the comparison of each of feature vectors 115 to each of the one or more Gaussian probability distributions. Acoustic modeling stage 120 provides senone scores 125 to phoneme evaluation stage 130.

In phoneme evaluation stage 130, Hidden Markov Models (HMMs) can be used to characterize a phoneme as a set of states and an a priori set of transition probabilities between each of the states, where a state is associated with a senone. For a given observed sequence of senones, there is a most-likely sequence of states in a corresponding HMM. This corresponding HMM can be associated with an observed phoneme. A Viterbi algorithm can be used to find the likelihood of each HMM corresponding to a phoneme.

The Viterbi algorithm performs a computation that starts with a first frame and then proceeds to subsequent frames one-at-a-time in a time-synchronous manner. A probability score is computed for each senone in the HMMs being considered. Therefore, a cumulative probability score can be successively computed for each of the possible senone sequences as the Viterbi algorithm analyzes sequential frames. Phoneme evaluation stage 130 provides the phoneme likelihoods or probabilities 135 (also referred to herein as a "phoneme score") to word modeling stage 140.

In word modeling stage 140, searching techniques are used to determine a most-likely string of phonemes and subsequent words, over time. Searching techniques such as, for example, tree-based algorithms can be used to determine the most-likely string of phonemes.

2. Conventional Speech Recognition System

FIG. 2 is an illustration of a conventional speech recognition system 200. Speech recognition system 200 includes an input device 210, a processing unit 220, a memory device 230, and a data bus 240, all of which are separate physical components. Memory device 230 can be, for example, a Dynamic Random Access Memory (DRAM) device that is external to processing unit 220 and in communication with processing unit 220 via data bus 240. Input device 210 is also in communication with processing unit 220 via data bus 240. Data bus 240 has a typical bus width of, for example, 8 to 32 bits.

Input device 210 is configured to receive an incoming voice signal (e.g., incoming voice signal 105 of FIG. 1) and convert acoustical vibrations associated with the incoming voice signal to an analog signal. The analog signal is digitized using an analog to digital converter (not shown in FIG. 2), and the resulting digital signal is transferred to processing unit 220 over data bus 240. Input device 210 can be, for example, a microphone.

Processing unit 220 is configured to process the digital input signal in accordance with the signal processing stage 110, acoustic modeling stage 120, phoneme evaluation stage 130, and word modeler stage 140 described above with respect to FIG. 1. FIG. 3 is an illustration of speech recognition system 200 with speech recognition modules performed by processing unit 220. Processing unit includes signal processing module 310, acoustic modeling module 320, phoneme evaluation module 330, and word modeling module 340, which operate in a similar manner as signal processing stage 110, acoustic modeling stage 120, phoneme evaluation stage 130, and word modeler stage 140 of FIG. 1, respectively.

In reference to FIG. 3, signal processing module 310 can convert a digital input signal representation of incoming voice signal 305 (e.g., from input device 210) into one or more feature vectors 315. Acoustic modeling module 320 compares one or more feature vectors 315 to one or more Gaussian probability distributions stored in an acoustic library in memory device 230. That is, for each of the comparisons of one or more feature vectors 315 to the one or more Gaussian probability distributions, processing unit 220 accesses memory device 230 via data bus 240. For an acoustic library with thousands of senones (in which each of the senones is composed of a plurality of Gaussian probability distributions), not only are the comparisons performed by acoustic modeling module 320 computationally-intensive but the thousands of accesses to memory device 230 via data bus 240 by acoustic modeling module 320 are also computationally-intensive and time consuming. The thousands of accesses to memory device 230 is further exacerbated by the bus width of data bus 240 (e.g., typically 8 to 32 bits), in which multiple accesses to memory device 230 may be required by acoustic modeling module 320 to access each Gaussian probability distribution. Further, interconnect parasitics associated with data bus 240 may corrupt data transfer between memory device 230 and acoustic modeling module 320.

Phoneme evaluation module 330 receives senone scores 325 from acoustic modeling module 320. As discussed above with respect to speech recognition process 100 of FIG. 1, HMMs can be used to characterize a phoneme as a set of states and an a priori set of transition probabilities between each of the states, where a state is composed of a sequence of senones. The sets of states and a priori sets of transition probabilities used by phoneme evaluation module 330 can be stored in memory device 230. Phoneme evaluation module 330 provides phoneme scores 335 to word modeling module 340.

Word modeling module 340 uses searching techniques such as, for example, tree-based algorithms to determine a most-likely string of phonemes (e.g., most-likely phoneme 335), and subsequent words, over time.

An issue with conventional speech recognition system 300 of FIG. 3, among others, is the significant load on processing unit 220 due to the acoustic modeling process. For example, for each comparison of one or more feature vectors 315 to the one or more Gaussian probability distributions stored in memory device 220, memory device 220 is accessed by processing unit 220. As a result, significant computing resources are dedicated to the acoustic modeling process, in turn placing a significant load on processing unit 220. The load placed on processing unit 220 by the acoustic modeling process affects the speed at which processing unit 220 can process digital signals from input device 210 as well as data from other applications (e.g., where processing unit 220 can operate in a multiuser/multiprogramming environment that concurrently processes data from a plurality of applications). Further, for computing systems with limited memory resources (e.g., handheld devices), the acoustic modeling process not only places a significant load on processing unit 220, but also consumes a significant portion of memory device 230 and bandwidth of data bus 240. These issues, among others, with processing capabilities, speed, and memory resources are further exacerbated by the need to process incoming voice signals in real-time or substantially close to real-time in many applications.

3. Speech Recognition Systems with an Acoustic Processing Unit

Embodiments of the present invention address the issues discussed above with respect to conventional speech recognition systems 200 and 300 of FIGS. 2 and 3, respectively. In an embodiment, the acoustic modeling process is performed by a dedicated processing unit (also referred to herein as an "Acoustic Processing Unit" or "APU"). The APU operates in conjunction with processing unit 220 of FIG. 3 (also referred to herein as a "Central Processing Unit" or "CPU"). For example, the APU receives one or more feature vectors (e.g., feature vectors 315 of FIG. 3) from the CPU, calculates a senone score (e.g., senone score 325 of FIG. 3) based on one or more Gaussian probability distributions, and outputs the senone score to the CPU. In an embodiment, the one or more Gaussian probability distributions can be stored in the APU. Alternatively, in another embodiment, the one or more Gaussian probability distributions can be stored externally to the APU, in which the APU receives the one or more Gaussian probability distributions from an external memory device. Based on the architecture of the APU, which is described in further detail below, an accelerated calculation for the senone score is achieved.

Although portions of the present disclosure is described in the context of a speech recognition system, a person skilled in the relevant art will recognize that the embodiments described herein are applicable to any data pattern recognition applications based on the description herein. These other data pattern recognition applications include, but are not limited to, image processing, audio processing, and handwriting recognition. These other data pattern recognition applications are within the spirit and scope of the embodiments disclosed herein.

Figure 4:
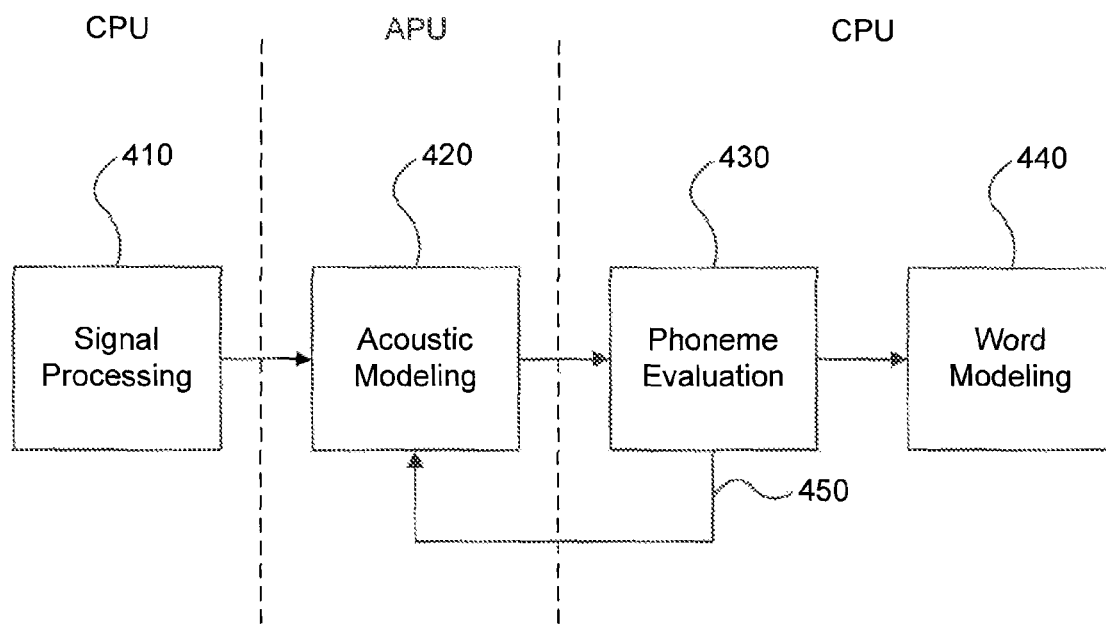
FIG. 4 is an illustration of an embodiment of speech recognition processes performed by an Acoustic Processing Unit (APU) and a Central Processing Unit (CPU).

FIG. 4 is an illustration of an embodiment of a speech recognition process 400 performed by the APU and CPU. In an embodiment, the CPU performs a signal processing process 410, a phoneme evaluation process 430, and a word modeling process 440. The APU performs an acoustic modeling process 420. Signal processing process 410, acoustic modeling process 420, phoneme evaluation process 430, and word modeling process 440 operate in a similar manner as signal processing stage 110, acoustic modeling stage 120, phoneme evaluation stage 130, and word modeler stage 140 of FIG. 1, respectively, except as otherwise described herein.

In reference to the embodiment of FIG. 4, feedback 450 is an optional feature of speech recognition process 400, in which phoneme evaluation process 430 can provide an active senone list to acoustic modeling process 420, according to an embodiment of the present invention. The APU can compare one or more feature vectors to one or more senones indicated in the active senone list. Such feedback 450 is further discussed below.

In another embodiment, acoustic modeling process 420 can compare the one or more feature vectors to all of the senones associated with an acoustic library. In this case, feedback 450 is not required, as phoneme evaluation process 430 receives an entire set of senone scores (e.g., "score all" function) from the APU for further processing.

A. System Bus Architectures for Speech Recognition Systems with an Acoustic Processing Unit In an embodiment, the APU and CPU can be in communication with one another over a Serial Peripheral Interface (SPI) bus, a Peripheral Controller Interface (PCI) bus, an Application Programming Interface (API) bus, an Advanced Microcontroller Bus Architecture High-Performance Bus (AHB), an Advanced Peripheral Bus (APB), a memory bus, or any other type of bus. Example, non-limiting embodiments of system bus architectures for speech recognition process 400 of FIG. 4 are described in further detail below.

Figure 5:
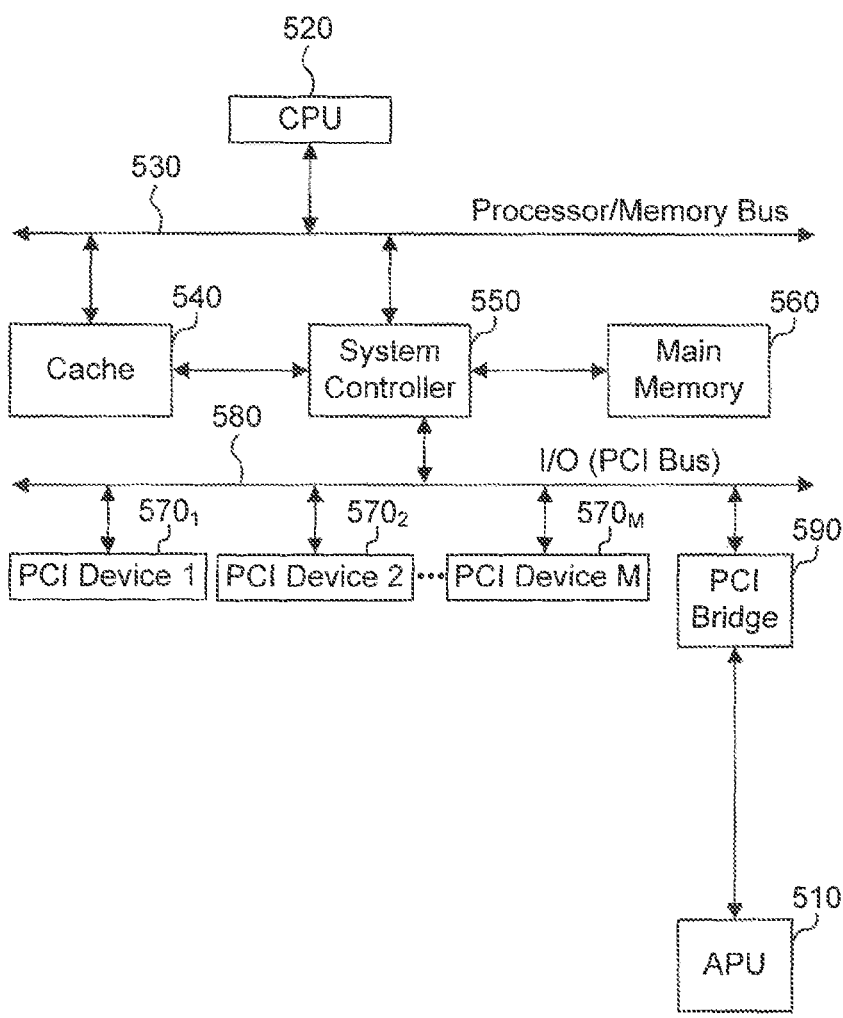
FIG. 5 is an illustration of an embodiment of a Peripheral Controller Interface (PCI) bus architecture for a speech recognition system.

FIG. 5 is an illustration of an embodiment of a bus architecture for a speech recognition system 500. Speech recognition system 500 includes an APU 510, a CPU 520, a processor/memory bus 530, a cache 540, a system controller 550, a main memory 560, a plurality of PCI devices $570_1$-$570_M$, an Input/Output (I/O) bus 580, and a PCI bridge 590. Cache 540 can be, for example, a second-level cache implemented on a Static Random Access Memory (SRAM) device. Further, main memory 560 can be, for example, a Dynamic Random Access Memory (DRAM) device. Speech recognition system 500 can be implemented as a system-on-chip (SOC), according to an embodiment of the present invention.

As illustrated in FIG. 5, APU 510 is communicatively coupled to I/O bus 580 through PCI bridge 590. I/O bus 580 can be, for example, a PCI bus. Through PCI bridge 590 and I/O bus 580, APU 510 is communicatively coupled to system controller 550 and CPU 520. In another embodiment (not illustrated in FIG. 5), APU 510 can be directly coupled to processor/memory bus 530 and, in turn, communicatively coupled to CPU 520.

Figure 6:
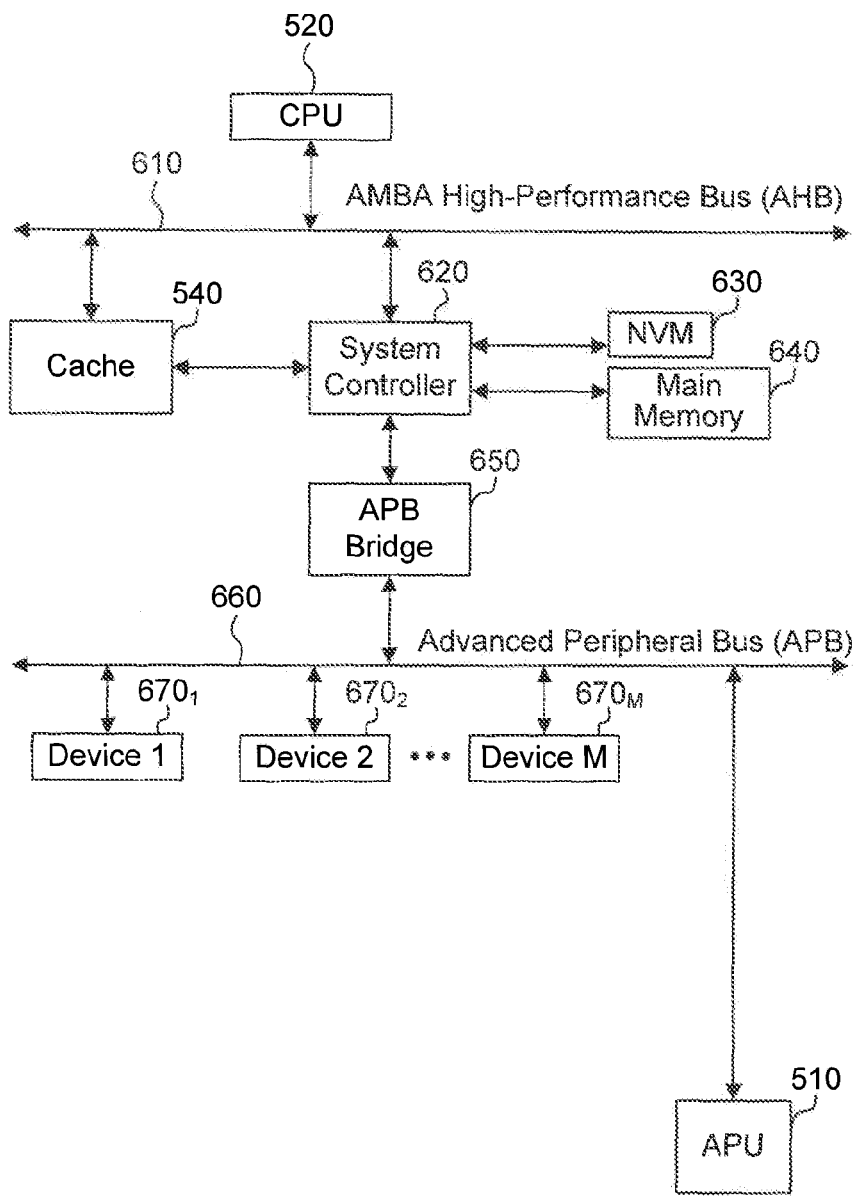
FIG. 6 is an illustration of an embodiment of an Advanced Peripheral Bus (APB) architecture for a speech recognition system.

FIG. 6 is an illustration of another embodiment of a bus architecture for a speech recognition system 600. Speech recognition system 600 includes APU 510, CPU 520, cache 540, an AHB 610, a system controller 620, a non-volatile memory device 630, a main memory 640, an APB bridge 650, an APB 660, and a plurality of devices $670_1$-$670_M$. Non-volatile memory device 630 can be, for example, a Flash memory device. Main memory 640 can be, for example, a DRAM device. CPU 520 can be, for example, an ARM processor (developed by ARM Holdings plc). Speech recognition system 600 can be implemented as an SOC, according to an embodiment of the present invention.

As illustrated in FIG. 6, APU 510 is communicatively coupled to system controller 620 through APB bridge 650 and APB 660. System controller 620 is also communicatively coupled to CPU 520 through AHB 610. In turn, system controller 620 is communicatively coupled to CPU 520 through AHB 610.

Figure 7:
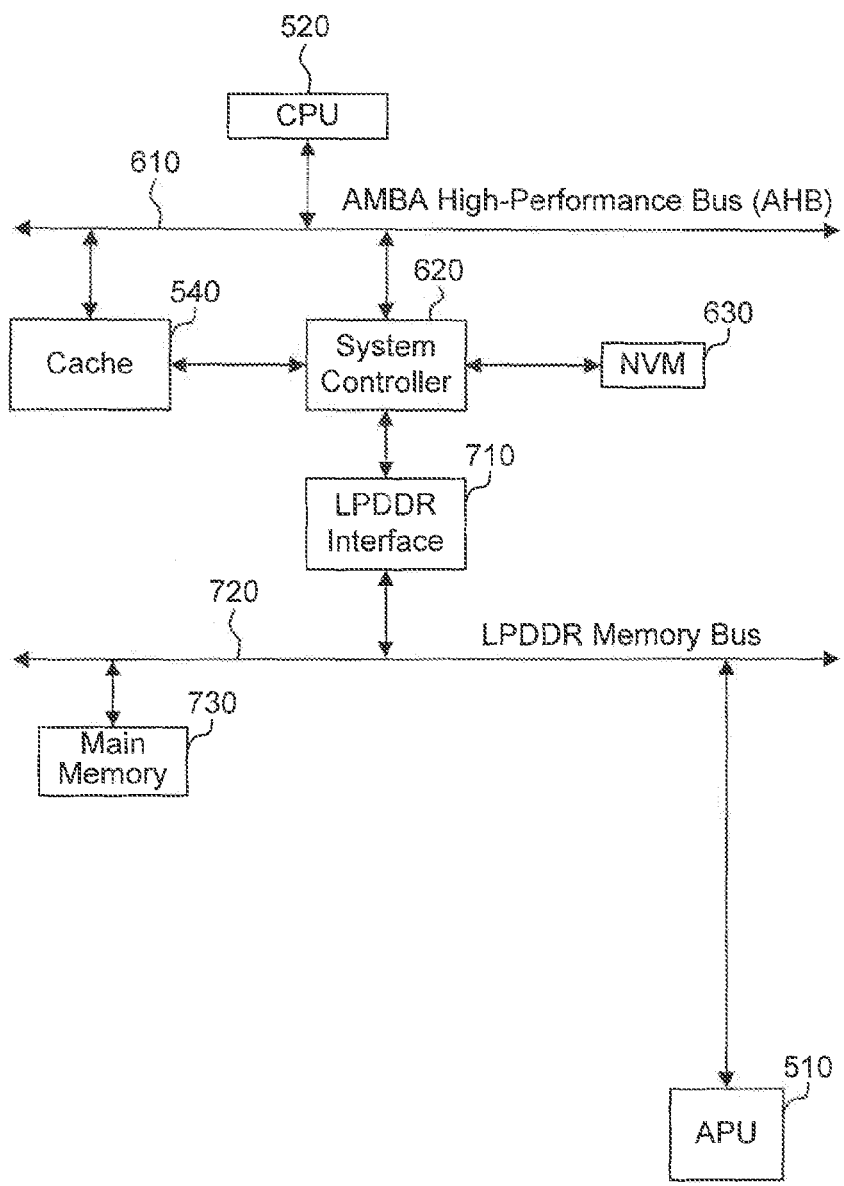
FIG. 7 is an illustration of an embodiment of a Low Power Double Data Rate (LPDDR) bus architecture for a speech recognition system.

FIG. 7 is an illustration of another embodiment of a bus architecture for a speech recognition system 700. Speech recognition system 700 includes APU 510, CPU 520, cache 540, AHB 610, system controller 620, non-volatile memory device 630, a Low Power Double Data Rate (LPDDR) interface 710, LPDDR memory bus 720, and a main memory 730. Main memory 730 can be, for example, a DRAM device. CPU 520 can be, for example, an ARM processor (developed by ARM Holdings plc). Speech recognition system 700 can be implemented as an SOC, according to an embodiment of the present invention.

As illustrated in FIG. 7, APU 510 and main memory 730 are communicatively coupled to LPDDR interface 710 via LPDDR memory bus 720. APU 510 is also communicatively coupled to system controller 620 through LPDDR memory bus 720 and LPDDR interface 710. In turn, system controller 620 is communicatively coupled to CPU 520 via AHB 610.

Figure 8:
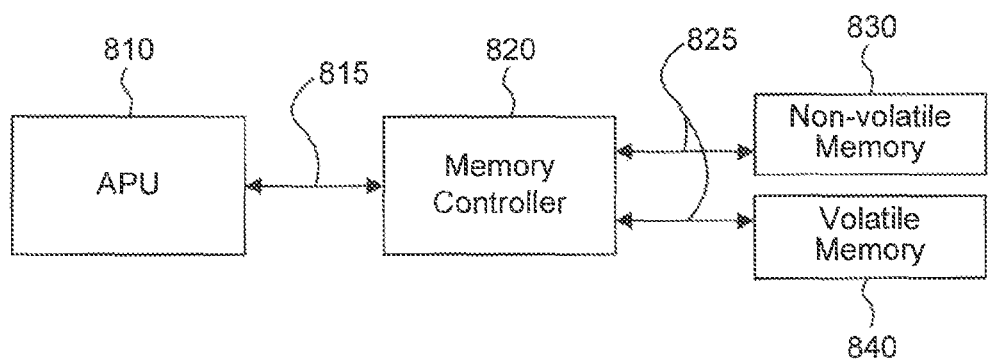
FIG. 8 is an illustration of an embodiment of a system-level architecture for a speech recognition system.

B. System-Level Architectures for Speech Recognition Systems with an Acoustic Processing Unit FIG. 8 is an illustration of an embodiment of a system-level architecture for a speech recognition system 800. Speech recognition system 800 includes an APU 810, a memory controller 820, a non-volatile memory device 830, and a volatile memory device 840. Memory controller 820 is communicatively coupled to APU 810 via a bus 815 and coupled to non-volatile memory device 830 and volatile memory device 850 via a bus 825 (which may represent two or more buses in certain embodiments). In an embodiment, APU 810 and memory controller 820 are integrated on a single chip. Alternatively, in an embodiment, APU 810 and memory controller 820 are integrated on separate chips. Non-volatile memory device 830 can be a NAND memory module, a NOR memory module, or another type of non-volatile memory device. In an embodiment, volatile memory device 840 can be a DRAM device. Further, APU 810 can communicate with a CPU (not shown in FIG. 8) using, for example, one of the bus architectures described above with respect to FIGS. 5-7, according to an embodiment of the present invention.

Non-volatile memory device 830 can store an acoustic library to be used in a speech recognition process, in which the acoustic library can include over 1000 senones, according to an embodiment of the present invention. In an embodiment, when a senone request is received by speech recognition system 800, memory controller 820 copies the acoustic library from non-volatile memory device 830 to volatile memory device 840 via bus 825. The acoustic library transfer process between the non-volatile and volatile memory devices can be implemented using, for example, a direct memory access (DMA) operation.

In an embodiment, speech recognition system 800 can be powered on in anticipation of a senone scoring request. After power up, the acoustic library from non-volatile memory device 830 is immediately copied to volatile memory device 840. Once volatile memory device 840 has received the acoustic library, APU 810 is ready to begin processing senone scoring requests (e.g., acoustic modeling process 420 of FIG. 4) using the acoustic library stored in volatile memory device 840.

When the senone scoring request is received by APU 810, a selected senone from the acoustic library is copied from volatile memory device 840 to APU 810 via memory controller 820. APU 810 calculates a senone score based on the selected senone and a data stream received by APU 810 (e.g., one or more feature vectors 315 of FIG. 3). After completing the calculation, APU 810 transfers the senone score to the requesting system (e.g., the CPU).

In an embodiment, after a predetermined time of inactivity (e.g., senone scoring inactivity by APU 810), volatile memory device 840 can be powered down. As a result, power efficiency in speech recognition system 800 can be improved, as a periodic refresh of memory cells in volatile memory device 840 will not be required. Here, the acoustic library is still stored in non-volatile memory device 830 such that the acoustic library can be retained when volatile memory device 840 is powered down. As would be understood by a person skilled in the art, when volatile memory device 840 is powered down, the contents stored therein (e.g., the acoustic library) will be lost. In an embodiment, when volatile memory device 840 is powered down, the other components of speech recognition system 800 can be powered down as well.

Figure 9:
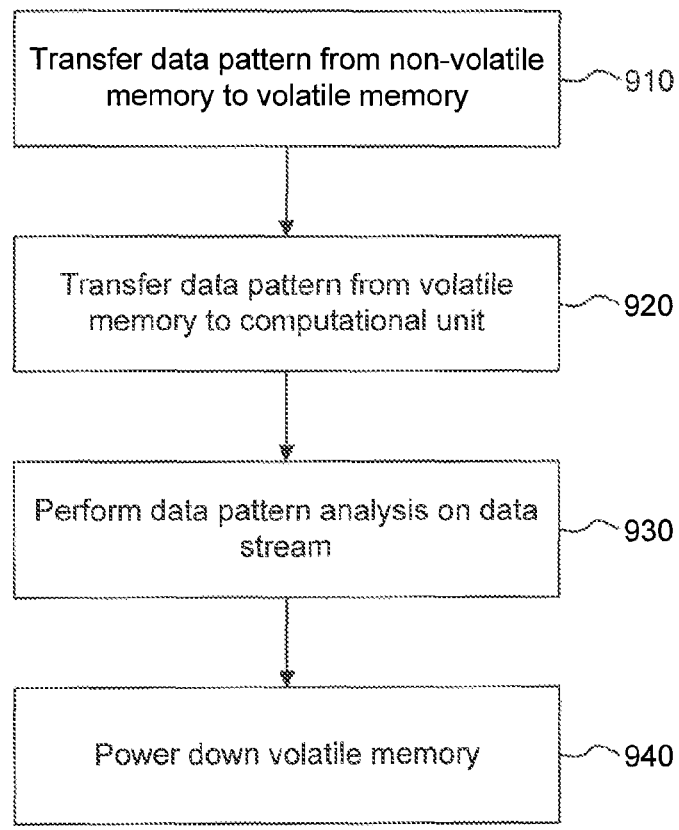
FIG. 9 is an illustration of an embodiment of a method for data pattern analysis.

FIG. 9 is an illustration of an embodiment of a method 900 for data pattern analysis. Speech recognition system 800 of FIG. 8 can be used, for example, to perform the steps of method 900. In an embodiment, method 900 can be used to perform acoustic modeling process 420 of FIG. 4. Based on the description herein, a person skilled in the relevant art will recognize that method 900 can be used in other data pattern recognition applications such as, for example, image processing, audio processing, and handwriting recognition.

In step 910, a plurality of data patterns is copied from a non-volatile memory device (e.g., non-volatile memory device 830 of FIG. 8) to a volatile memory device (e.g., volatile memory device 840 of FIG. 8). In an embodiment, the plurality of data patterns can be one or more senones associated with an acoustic library.

In step 920, a data pattern from the volatile memory device is requested by a computational unit (e.g., APU 810 of FIG. 8) and transferred to the computational unit via a memory controller and bus (e.g., memory controller 820 and bus 825, respectively, of FIG. 8). In an embodiment, the requested data pattern is a senone from an acoustic library stored in the volatile memory device.

In step 930, after receiving the requested data pattern, the computational unit (e.g., APU 810 of FIG. 8) performs a data pattern analysis on a data stream received by the computational unit. In an embodiment, the data pattern analysis is a senone score calculation based on a selected senone and the data stream received by the computational unit (e.g., one or more feature vectors 315 of FIG. 3). After completing the data pattern analysis, the computational unit transfers the data pattern analysis result to the requesting system (e.g., the CPU).

In step 940, the volatile memory device powers down. In an embodiment, the volatile memory device powers down after a predetermined time of inactivity (e.g., inactivity in the data pattern analysis by the computational unit). As a result, power efficiency can be improved, as a periodic refresh of memory cells in the volatile memory device will not be required. In an embodiment, when the volatile memory device is powered down, the other components of the system (e.g., other components of speech recognition system 800) can be powered down as well.

Figure 10:
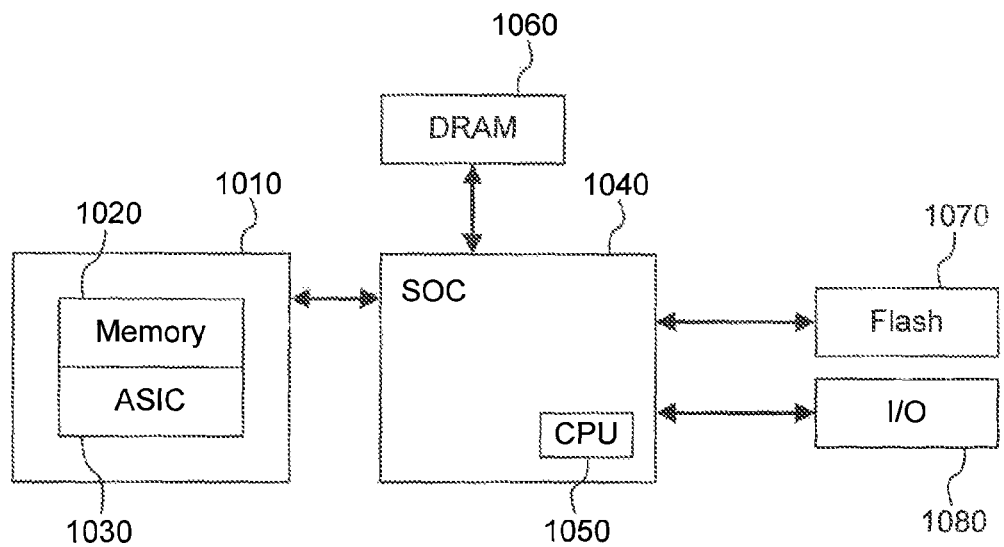
FIG. 10 is an illustration of an embodiment of a system-level architecture for a speech recognition system with an integrated Application-Specific Integrated Circuit (ASIC) and memory device.

FIG. 10 is an illustration of another embodiment of a system-level architecture for a speech recognition system 1000. Speech recognition system 1000 includes an APU 1010, a SOC 1040, a DRAM device 1060, a Flash memory device 1070, and an I/O interface 1080. In an embodiment, APU 1010 is an integrated chip that includes a memory device 1020 configured to store an acoustic library and an Application-Specific Integrated Circuit (ASIC) 1030 configured to perform an acoustic modeling process (e.g., acoustic modeling process 420 of FIG. 4). In another embodiment, ASIC 1030 and memory device 1020 can be integrated on two separate chips. SOC 1040 includes a CPU 1050 configured to perform a signal processing process, a phoneme evaluation process, and a word modeling process (e.g., signal processing process 410, phoneme evaluation process 430, and word modeling process 440, respectively, of FIG. 4), according to an embodiment of the present invention. In an embodiment, APU 1010 and SOC 1040 are integrated on two separate chips.

Figure 11:
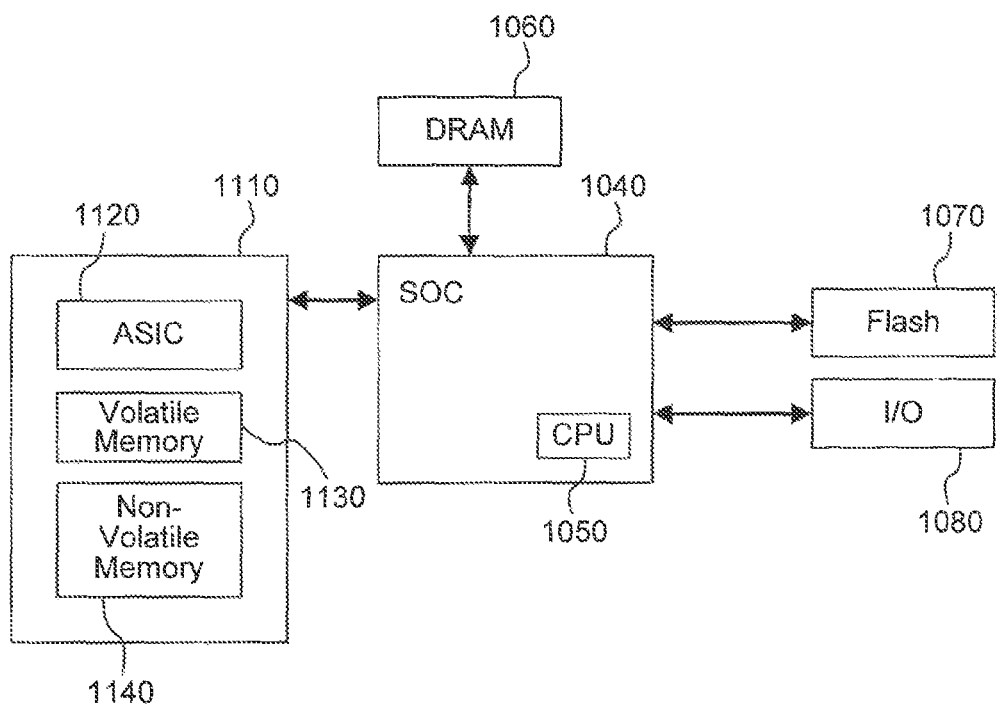
FIG. 11 is an illustration of an embodiment of a system-level architecture for a speech recognition system with an integrated Application-Specific Integrated Circuit (ASIC), volatile memory device, and non-volatile memory device.

FIG. 11 is an illustration of another embodiment of a system-level architecture for a speech recognition system 1100. Speech recognition system 1100 includes an APU 1110, SOC 1040, DRAM device 1060, Flash memory device 1070, and I/O interface 1080. In an embodiment, APU 1110 is an integrated chip that includes an ASIC 1120, a volatile memory device 1130, and a non-volatile memory device 1140. In another embodiment, ASIC 1120, volatile memory device 1130, and non-volatile memory device 1140 can be integrated on two chips—e.g., ASIC 1120 and memory device 1130 on one chip with non-volatile memory device 1140 on another chip; ASIC 1120 on one chip with volatile memory device 1130 and non-volatile memory device 1140 on another chip; or, ASIC 1120 and non-volatile memory device 1140 on one chip with volatile memory device 1130 on another chip. In yet another embodiment, ASIC 1120, volatile memory device 1130, and non-volatile memory device 1140 can each be integrated on a separate chip—i.e., three separate chips.

Non-volatile memory device 1140 can be configured to store an acoustic model that is copied to volatile memory device 1130 upon power-up of APU 1110, according to an embodiment of the present invention. In an embodiment, non-volatile memory device can be a Flash memory device and volatile memory device 1130 can be a DRAM device. Further, ASIC 1120 can be configured to perform an acoustic modeling process (e.g., acoustic modeling process 420 of FIG. 4), according to an embodiment of the present invention.

Figure 12:
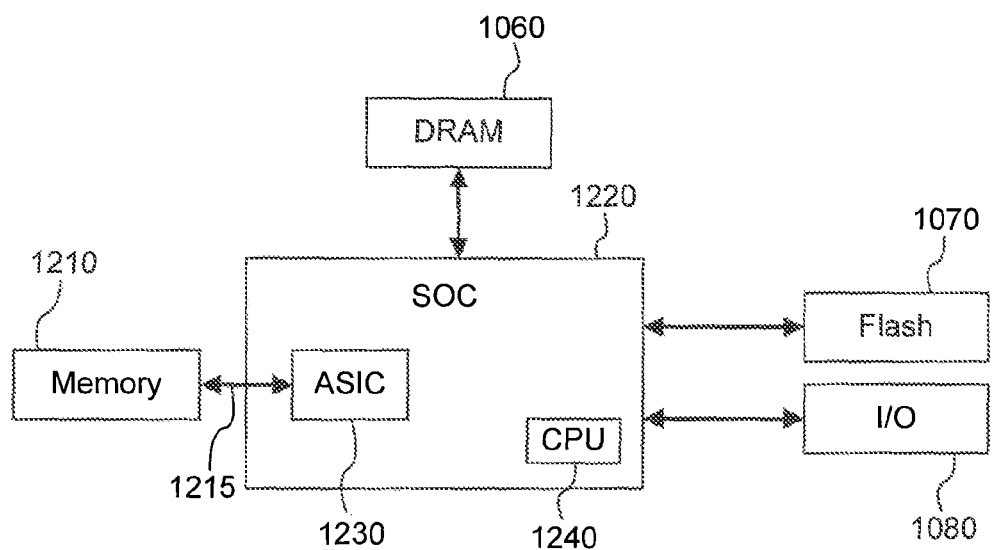
FIG. 12 is an illustration of an embodiment of a system-level architecture for a speech recognition system with a System-On-Chip that includes an Application-Specific Integrated Circuit (ASIC) and a Central Processing Unit (CPU).

FIG. 12 is an illustration of another embodiment of a system-level architecture for a speech recognition system 1200. Speech recognition system 1200 includes DRAM device 1060, Flash memory device 1070, I/O interface 1080, a memory device 1210, and an SOC 1220. In an embodiment, SOC 1220 is an integrated chip that includes an ASIC 1230 and a CPU 1240. ASIC 1230 can be configured to perform an acoustic modeling process (e.g., acoustic modeling process 420 of FIG. 4) and CPU 1240 can be configured to perform a signal processing process, a phoneme evaluation process, and a word modeling process (e.g., signal processing process 410, phoneme evaluation process 430, and word modeling process 440, respectively, of FIG. 4), according to an embodiment of the present invention.

Memory device 1210 can be configured to store an acoustic library and to transfer one or more senones to ASIC 1230 via an I/O bus 1215, according to an embodiment of the present invention. In an embodiment, memory device 1210 can be a DRAM device or a Flash memory device. In another embodiment, the acoustic library can be stored in a memory device located within ASIC 1230 (not shown in FIG. 12) rather than memory device 1210. In yet another embodiment, the acoustic library can be stored in system memory for SOC 1220 (e.g., DRAM device 1060).

Figure 13:
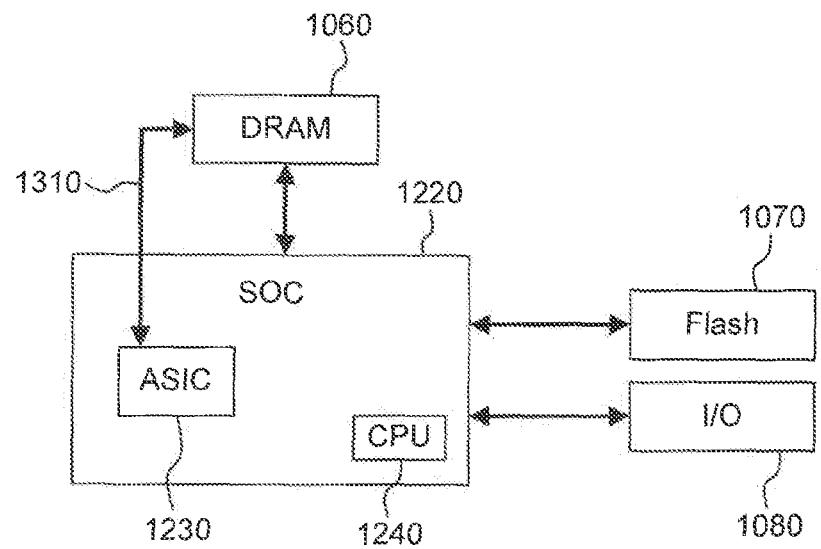
FIG. 13 is an illustration of another embodiment of a system-level architecture for a speech recognition system with a System-On-Chip that includes an Application-Specific Integrated Circuit (ASIC) and a Central Processing Unit (CPU).

FIG. 13 is another illustration of an embodiment of a system-level architecture for a speech recognition system 1300. Speech recognition system 1300 includes DRAM device 1060, Flash memory device 1070, I/O interface 1080, a memory device 1210, and an SOC 1220. DRAM device 1060 can be configured to store an acoustic library and to transfer one or more senones to ASIC 1230 via an I/O bus 1315, according to an embodiment of the present invention.

4. Acoustic Processing Unit Architecture

Figure 14:
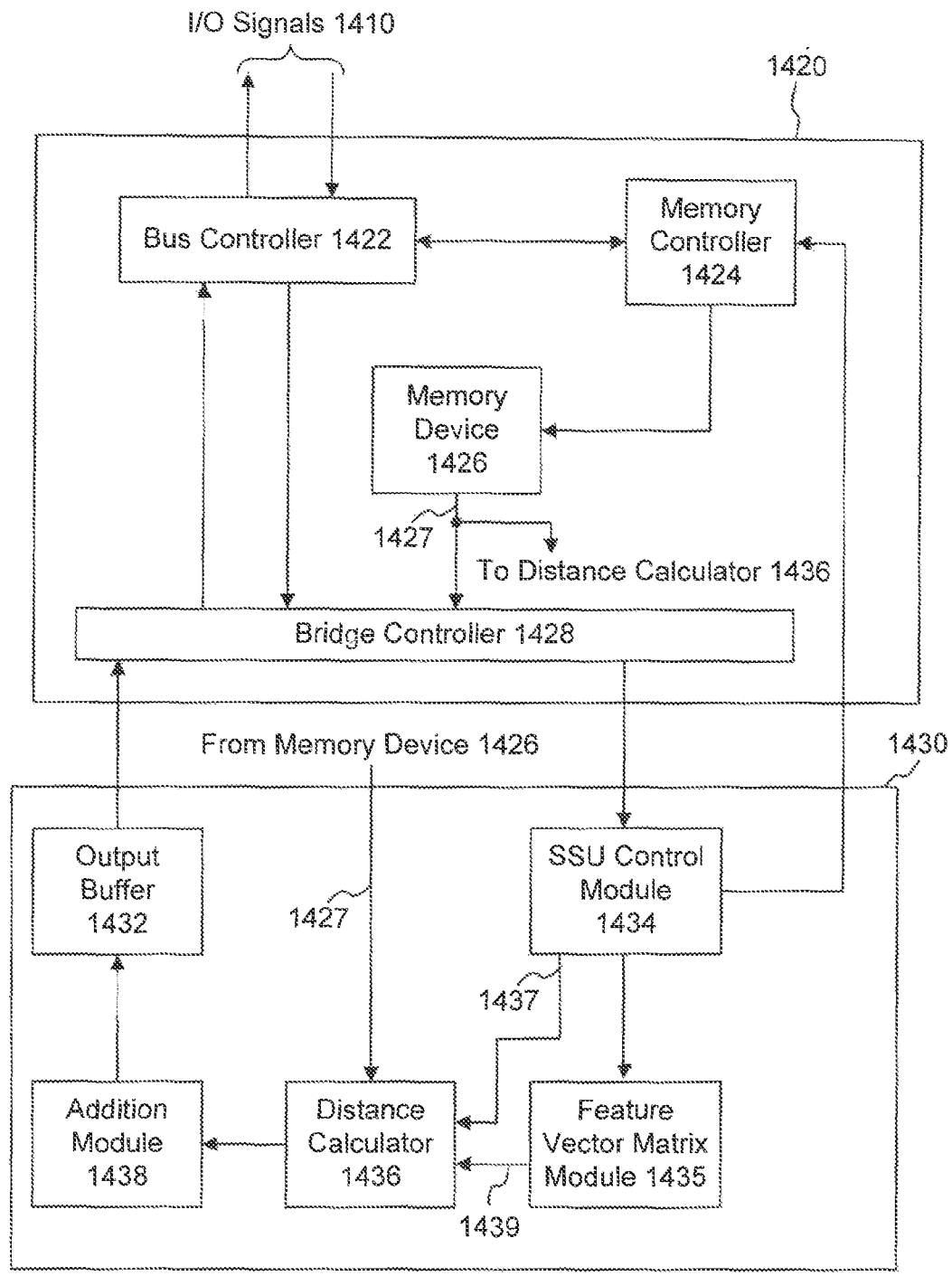
FIG. 14 is an illustration of an embodiment of an Acoustic Processing Unit (APU).

FIG. 14 is an illustration of an embodiment of an APU 1400. In an embodiment, APU 1400 is an integrated chip that includes a memory module 1420 and a Senone Scoring Unit (SSU) 1430. In another embodiment, memory module 1420 and SSU 1430 can be integrated on two separate chips.

APU 1400 is in communication with a CPU (not shown in FIG. 14) via I/O signals 1410, in which APU 1400 is configured to perform an acoustic modeling process (e.g., acoustic modeling process 420 of FIG. 4), according to an embodiment of the present invention. In an embodiment, I/O signals 1410 can include an input feature vector data line for feature vector information, an input clock signal, an input APU enable signal, an output senone score data line for senone score information, and other I/O control signals for APU 1400. APU 1400 can be configured to receive one or more feature vectors (calculated by the CPU) via the feature vector data line from the CPU and to transmit a senone score via the senone score data line to the CPU for further processing, according to an embodiment of the present invention. In an embodiment, I/O signals 1410 can be implemented as, for example, an SPI bus, a PCI bus, an API bus, an AHB, an APB, a memory bus, or any other type of bus to provide a communication path between APU 1400 and the CPU (see, e.g., FIGS. 5-7 and associated description). An interface between APU 1400 and the CPU, as well as control signals for the interface, are described in further detail below.

In an embodiment, memory module 1420 and SSU 1430 can operate in two different clock domains. Memory module 1420 can operate at the clock frequency associated with the input clock signal to APU 1400 (e.g., from I/O signals 1410) and SSU 1430 can operate at a faster clock frequency based on the input clock signal, according to an embodiment of the present invention. For example, if the clock frequency associated with the input clock signal is 12 MHz, then SSU 1430 can operate at a clock-divided frequency of 60 MHz—five times faster than the clock frequency associated with the input clock signal. Techniques and methods for implementing clock dividers are known to a person skilled in the relevant art. As will be described in further detail below, the architecture of SSU 1430 can be based on the clock domain at which it operates.

In reference to FIG. 14, memory module 1420 includes a bus controller 1422, a memory controller 1424, a memory device 1426, and a bridge controller 1428. Memory device 1426 is configured to store an acoustic model to be used in a speech recognition process. In an embodiment, memory device 1426 can be a non-volatile memory device such as, for example, a Flash memory device. The acoustic library can be pre-loaded into the non-volatile memory device prior to operation of APU 1400 (e.g., during manufacturing and/or testing of APU 1400).

In another embodiment, memory device 1426 can be a volatile memory device such as, for example, a DRAM device. In an embodiment, when a senone request is received by APU 1400, memory controller 1424 can copy the acoustic library from a non-volatile memory device (either integrated on the same chip as APU 1400 or located external to APU 1400) to the volatile memory device. The acoustic library transfer process between the non-volatile and volatile memory devices can be implemented using, for example, a DMA operation.

Bus controller 1422 is configured to control data transfer between APU 1400 and an external CPU. In an embodiment, bus controller 1422 can control the receipt of feature vectors from the CPU and the transmission of senone scores from APU 1400 to the CPU. In an embodiment, bus controller 1422 is configured to transfer one or more feature vectors from the CPU to bridge controller 1428, which serves as an interface between memory module 1420 and SSU 1430. In turn, bridge controller 1428 transfers the one or more feature vectors to SSU 1430 for further processing. Upon calculation of a senone score, the senone score is transferred from SSU 1430 to memory module 1420 via bridge controller 1428, according to an embodiment of the present invention.

In an embodiment, bus controller 1422 can receive a control signal (via I/O signals 1410) that provides an active senone list. In an embodiment, the active senone list can be transferred to APU 1400 as a result of the phoneme evaluation process performed by the CPU (e.g., phoneme evaluation process 430 of FIG. 4). That is, in an embodiment, a feedback process can occur between the acoustic modeling process performed by APU 1400 and the phoneme evaluation process performed by the CPU (e.g., feedback 450 of FIG. 4). The active senone list can be used in senone score calculations for incoming feature vectors into APU 1400, according to an embodiment of the present invention.

The active senone list indicates one or more senones stored in memory device 1426 to be used in a senone score calculation. In an embodiment, the active senone list can include a base address associated with an address space of memory device 1426 and a list of indices related to the base address at which the one or more senones are located in memory device 1426. Bus controller 1422 can send the active senone list to SSU 1430 via bridge controller 1428, in which SSU 1430 is in communication with memory device 1426 (via memory controller 1424) to access the one or more senones associated with the active senone list.

In another embodiment, bus controller 1422 can receive a control signal (via I/O signals 1410) that instructs APU 1400 to perform the senone score calculation using all of the senones contained in the acoustic library (e.g., "score all" function). Bus controller 1422 sends the "score all" instruction to SSU 1430 via bridge controller 1428, in which SSU 1430 is in communications with memory device 1426 (via memory controller 1424) to access all of the senones associated with the acoustic library.

Conventional speech recognition systems typically incorporate a feedback loop between acoustic modeling and phoneme evaluation modules (e.g., acoustic modeling module 320 and phoneme evaluation module 330 of FIG. 3) within the CPU to limit the number of senones used in senone score calculations. This is because, as discussed above with respect to speech recognition system 300 of FIG. 3, significant computing resources are dedicated to the acoustic modeling process where thousands of senones can be compared to a feature vector. This places a significant load on the CPU and the bandwidth of the data bus (e.g., data 240 of FIG. 3) transferring the senones from the memory device (e.g., memory device 230 of FIG. 3) to the CPU. Thus, for conventional speech recognition systems, active senone lists are used to limit the impact of the acoustic modeling process on the CPU. However, the use active senone lists by the CPU can place limitations on the need to process incoming voice signals in real-time or substantially close to real time.

The "score all" function of APU 1400 not only alleviates the load on the CPU and the bandwidth of the data bus, but also provides processing of incoming voice signals in real-time or substantially close to real time. As discussed in further detail below, features of APU 1400 such as, for example, the bus width of data bus 1427 and the architecture of distance calculator 1436 of FIG. 14 provides a system for real-time or substantially close to real time speech recognition.

In reference to FIG. 14, SSU 1430 includes an output buffer 1432, an SSU control module 1434, a feature vector matrix module 1435, a distance calculator 1436, and an addition module 1438. SSU 1430 is configured to calculate a Mahalanobis distance between one or more feature vectors and one or more senones stored in memory device 1426, according to an embodiment of the present invention. Each of the one or more feature vectors can be composed of N dimensions, where N can equal, for example, 39. In an embodiment, each of the N dimensions in the one or more feature vectors can be a 16-bit mean value.

Further, each of the one or more senones stored in memory device 1426 is composed of one or more Gaussian probability distributions, where each of the one or more Gaussian probability distributions has the same number of dimensions as each of the one or more feature vectors (e.g., N dimensions). Each of the one or more senones stored in memory device 1426 can have, for example, 32 Gaussian probability distributions.

As discussed above, memory module 1420 and SSU 1430 can operate in two different clock domains. In an embodiment, SSU control module 1434 is configured to receive a clock signal from memory module 1420 via bridge controller 1428. The frequency of the clock signal received by SSU control module 1434 can be the same or substantially the same as the clock frequency associated with the input clock signal to APU 1400 (e.g., input clock signal from I/O signals 1410), according to an embodiment of the present invention.

In an embodiment, SSU control module 1434 can divide the frequency of its incoming clock signal and distribute that divided clock signal to other components of SSU 1430—e.g., output buffer 1432, feature vector matrix module 1435, distance calculator 1436, and addition module 1438—such that these other components operate at the clock-divided frequency. For example, if the clock frequency associated with the input clock signal (e.g., from I/O signals 1410) is 12 MHz, then SSU control module 1434 can receive the same or substantially the same clock signal from bridge controller 1428 and divide that clock frequency using known clock-dividing techniques and methods to a frequency of, for example, 60 MHz. SSU control module 1434 can distribute this clock-divided signal to the other components of SSU 1430 such that these other components operate at, for example, 60 MHz—five times faster than the clock frequency associated with the input clock signal.

For simplicity purposes, the clock signals distributed from SSU control module 1434 to the other components of SSU 1430 are not illustrated in FIG. 14. For ease of reference, the frequency associated with this clock signal is also referred to herein as the "SSU clock frequency." Further, for ease of reference, the frequency associated with the input clock signal to SSU control module 1434 is also referred to herein as the "memory module clock frequency."

Figure 15:
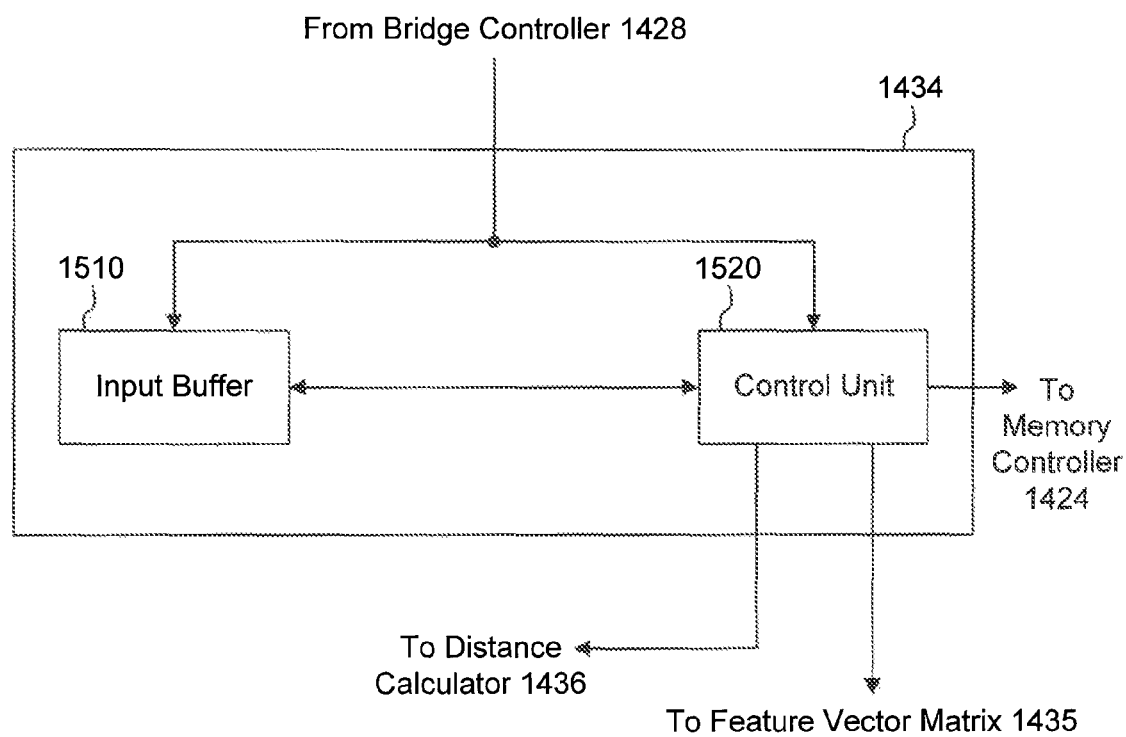
FIG. 15 is an illustration of an embodiment of a Senone Scoring Unit (SSU) controller for an Acoustic Processing Unit (APU).

FIG. 15 is an illustration of an embodiment of SSU control module 1434. SSU control module 1434 includes an input buffer 1510 and a control unit 1520. SSU control module 1434 is configured to receive one or more control signals from memory module 1420 via bridge controller 1428. In an embodiment, the one or more control signals can be associated with I/O signals 1410 and with control information associated with a Gaussian probability distribution outputted by memory device 1426. The control signals associated with I/O signals 1410 can include, for example, an active senone list and a "score all" function. The control information associated with the Gaussian probability distribution can include, for example, address information for a subsequent Gaussian probability distribution to be outputted by memory device 1426.

In reference to FIG. 14, in an embodiment, when bus controller 1422 receives an active senone list via I/O signals 1410, the base address associated with the address space of memory device 1426 and list of indices related to the base address at which the one or more senones are located in memory device 1426 can be stored in input buffer 1510 of FIG. 15. Control unit 1520 is in communication with input buffer 1510 to monitor the list of the senones to be applied by distance calculator 1436 of FIG. 14 in the senone score calculation.

For example, the active senone list can contain a base address associated with an address space of memory device 1426 and 100 indices pointing to 100 senones stored in memory device 1426. As would be understood by a person skilled in the relevant art, the indices can refer to pointers or memory address offsets in reference to the base address associated with the address space of memory device 1426. Further, as discussed above, a senone can be composed of one or more Gaussian probability distributions, where each of the one or more Gaussian probability distributions has the same number of dimensions as each of one or more feature vectors (e.g., N dimensions) received by APU 1400. For explanation purposes, this example will assume that each senone stored in memory device 1426 is composed of 32 Gaussian probability distributions. Based on the description herein, a person skilled in the relevant art will understand that each of the senones can be composed of more or less than 32 Gaussian probability distributions.

In an embodiment, for the first senone in the active senone list, control unit 1520 communicates with memory controller 1424 of FIG. 14 to access the first senone in memory device 1426 based on the base address and the first index information contained in the active senone list. The senone associated with the first index can include memory address information of the first 2 Gaussian probability distributions associated with that senone, according to an embodiment of the present invention. In turn, memory device 1426 accesses two Gaussian probability distributions associated with the first senone in, for example, a sequential manner. For example, memory device 1426 accesses the first Gaussian probability distribution and outputs this Gaussian probability distribution to distance calculator 1436 via data bus 1427. As memory device 1426 outputs the first Gaussian probability distribution, memory device 1426 can also access the second Gaussian probability distribution.

In an embodiment, the second Gaussian probability distribution can include memory address information for a third Gaussian probability distribution to be accessed by memory device 1426. Memory device 1426 can communicate this memory address information to control unit 1520 of FIG. 15 via bridge controller 1428 of FIG. 14. Control unit 1520, in turn, communicates with memory controller 1424 of FIG. 14 to access the third Gaussian probability distribution. In an embodiment, as the third Gaussian probability distribution is being accessed by memory device 1426, the second Gaussian probability distribution can be outputted to distance calculator 1436 via data bus 1427. This iterative, overlapping process of accessing a subsequent Gaussian probability distribution while outputting a current Gaussian probability distribution is performed for all of the Gaussian probability distributions associated with the senone (e.g., for all of the 32 Gaussian probability distributions associated with the senone). A benefit, among others, of the iterative, overlapping (or parallel) processing is faster performance in senone score calculations.

Control unit 1520 of FIG. 15 monitors the transfer process of Gaussian probability distributions from memory device 1426 to distance calculator 1436 such that the memory access and transfer process occurs in a pipeline manner, according to an embodiment of the present invention. After the 32 Gaussian probability distributions associated with the first senone is outputted to distance calculator 1436 of FIG. 14, control unit 1520 repeats the above process for the one or more remaining senones in the active senone list.

After the senones in the active senone list are used in the senone score calculations for a current feature vector, memory module 1420 can receive a control signal via I/O signals 1410 that indicates that the active senone list from the current feature vector is to be used in senone score calculations for a subsequent feature vector, according to an embodiment of the present invention. Upon receipt of the control signal from memory module 1420 via bridge controller 1428, SSU control module 1434 uses the same active senone list from the current feature vector in the senone score calculations for the subsequent feature vector. In particular, control unit 1520 of FIG. 15 applies the same base address and list of indices related to the base address stored in input buffer 1510 to the subsequent feature vector. Control unit 1520 of FIG. 15 monitors the transfer process of Gaussian probability distributions from memory device 1426 to distance calculator 1436 for the subsequent feature vector in a similar manner as described above with respect to the active senone list example.

In another embodiment, memory module 1420 can receive a control signal via I/O signals 1410 that indicates a "score all" operation. As discussed above, the "score all" function refers to an operation where a feature vector is compared to all of the senones contained in an acoustic library stored in memory device 1426. In an embodiment, control unit 1520 of FIG. 15 communicates with memory controller 1424 of FIG. 14 to access a first senone in memory device 1426. The first senone can be, for example, located at a beginning memory address associated with an address space of memory device 1426. Similar to the active senone list example above, the first senone in memory device 1426 can include memory address information of the first 2 Gaussian probability distributions associated with that senone, according to an embodiment of the present invention. In turn, memory device 1426 accesses two Gaussian probability distributions associated with the first senone in, for example, a sequential manner.

In an embodiment, similar to the active senone list example above, the second Gaussian probability distribution can include memory address information on a third Gaussian probability distribution to be accessed by memory device 1426. Memory device 1426 can communicate this memory address information to control unit 1520 of FIG. 15 via bridge controller 1428 of FIG. 14. Control unit 1520, in turn, communicates with memory controller 1424 of FIG. 14 to access the third Gaussian probability distribution. In an embodiment, as the third Gaussian probability distribution is being accessed by memory device 1426, the second Gaussian probability distribution can be outputted to distance calculator 1436 via data bus 1427. This iterative, overlapping process of accessing a subsequent Gaussian probability distribution while outputting a current Gaussian probability distribution is performed for all of the Gaussian probability distributions associated with the senone (e.g., for all of the 32 Gaussian probability distributions associated with the senone).

Control unit 1520 of FIG. 15 monitors the transfer process of Gaussian probability distributions from memory device 1426 to distance calculator 1436 such that the memory access and transfer process occurs in a pipeline manner, according to an embodiment of the present invention. After the Gaussian probability distributions associated with the first senone are outputted to distance calculator 1436 of FIG. 14, control unit 1520 repeats the above process for the one or more remaining senones in the acoustic library.

In reference to FIG. 14, feature vector matrix module 1435 is used for speaker adaptation in APU 1400. In an embodiment, feature vector matrix module 1435 receives a feature vector transform matrix (FVTM) from the CPU via I/O signals 1410. The FVTM can be loaded into feature vector matrix module 1435 periodically such as, for example, once per utterance. In an embodiment, the FVTM can be stored in a Static Random Access Memory (SRAM) device located within feature vector matrix module 1435.

Along with mean and variance values stored for each senone in memory device 1426, an index can also be stored for each senone, in which the index points to a row in the FVTM, according to an embodiment of the present invention. The number of rows in the FVTM can vary (e.g., 10, 50, or 100 rows) and can be specific to a voice recognition system implementing APU 1400. Each row in the FVTM can have an equal number of entries as the N number of dimensions for a feature vector (e.g., 39), where each of the entries is a scaling factor that is multiplied to its corresponding feature vector dimension to produce a new feature vector, according to an embodiment of the present invention. The selected row from the FVTM (e.g., row of 39 scaling factors) is transferred to distance calculator 1436 via data bus 1439, in which distance calculator 1436 performs the multiplication operation to generate the new feature vector, as will be described in further detail below.

In an embodiment, SSU control module 1434 provides a feature vector received from the CPU and an index associated with a senone to feature vector matrix module 1435. The index indicates a particular row in the FVTM for scaling the feature vector. For example, the FVTM can have 100 rows and the index can be equal to 10. Here, for a feature vector with 39 dimensions, the 10th row of the FVTM contains 39 scaling factors, in which the row of scaling factors is transferred to distance calculator 1436 to generate the new feature vector.

Figure 16:
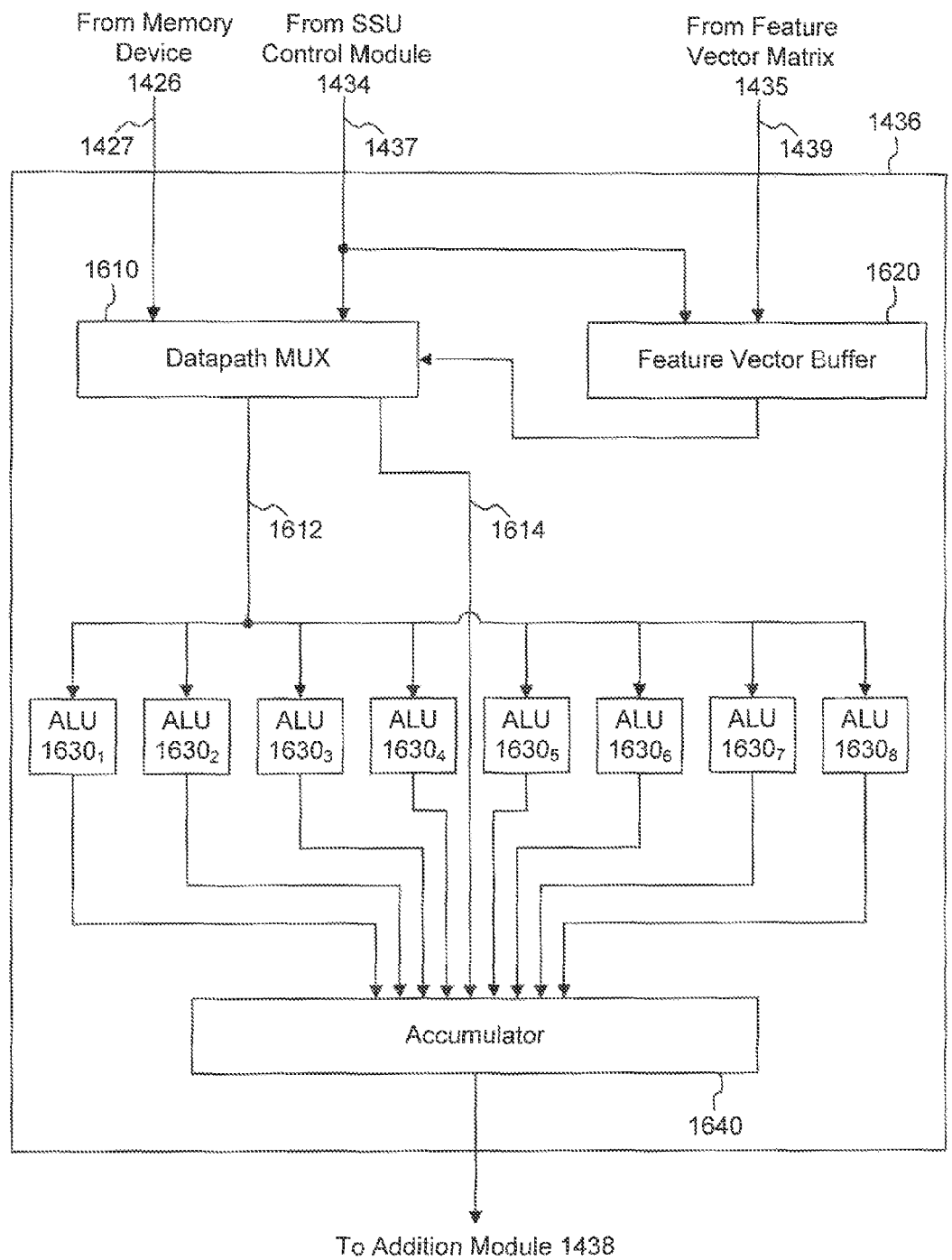
FIG. 16 is an illustration of an embodiment of a distance calculator for an Acoustic Processing Unit (APU).

In reference to FIG. 14, distance calculator 1436 is configured to calculate a distance between one or more dimensions of a senone stored in memory device 1426 and a corresponding one or more dimensions of a feature vector. FIG. 16 is an illustration of an embodiment of distance calculator 1436. Distance calculator 1436 includes a datapath multiplexer (MUX) 1610, a feature vector buffer 1620, arithmetic logic units (ALUs) 1630$_1$-1630$_8$, and an accumulator 1640.

Datapath MUX 1610 is configured to receive a Gaussian probability distribution from memory device 1426 of FIG. 14 via data bus 1427. In an embodiment, the width of data bus 1427 is equal to the number of bits associated with one Gaussian probability distribution. For example, if one Gaussian probability distribution is 768 bits, then the width of data bus 1427 is also 768 bits. Over a plurality of Gaussian probability distribution dimensions, the 768 bits associated with the Gaussian probability distribution can be allocated to a 16-bit mean value, a 16-bit variance value, and other attributes per Gaussian probability distribution dimension. As discussed above, the Gaussian probability distribution can have the same number of dimensions as a feature vector—e.g., 39 dimensions. In another embodiment, the width of data bus 1427 can be greater than 256 bits.

Further, in an embodiment, memory device 1426 and distance calculator 1436 can be integrated on the same chip, where data bus 1427 is a wide bus (of the width discussed above) integrated on the chip to provide data transfer of the Gaussian probability distribution from memory device 1426 to distance calculator 1436. In another embodiment, memory device 1426 and distance calculator 1436 can be integrated on two separate chips, where data bus 1427 is a wide bus (of the width discussed above) that is tightly coupled between the two chips such that degradation of data due to noise and interconnect parasitic effects are minimized. As will be discussed below, a benefit of a wide data bus 1427 (of the width discussed above), among others, is to increase performance of APU 1400 in the calculation of senone scores.

Datapath MUX 1610 is also configured to receive one or more control signals and a feature vector from SSU control module 1434 via data bus 1437, as well as feature vector scaling factors from feature vector buffer 1620. In an embodiment, feature vector buffer 1620 can be configured to store scaling factors (associated with a selected row of the FVTM) transferred from feature vector matrix module 1435 via data bus 1439. In another embodiment, feature vector buffer 1620 can be configured to store the FVTM. Here, one or more control signals from SSU control module 1434 via data bus 1437 can be used to select the FVTM row. Datapath MUX 1610 outputs the feature vector, selected feature vector scaling factors from the FVTM, and Gaussian probability distribution information to ALUs $1630_1$-$1630_8$ via data bus 1612 for further processing.

In an embodiment, datapath MUX 1610 is also configured to receive a Gaussian weighting factor from the one or more controls signals from SSU control module 1434 via data bus 1437. Datapath MUX 1610 is configured to output the Gaussian weighting factor to accumulator 1640 for further processing.

In reference to FIG. 16, each of ALUs $1630_1$-$1630_8$ is configured, per SSU clock cycle, to calculate a distance score between a dimension of a Gaussian probability distribution received from datapath MUX 1610 and a corresponding dimension of a feature vector, according to an embodiment of the present invention. In an embodiment, ALUs $1630_1$-$1630_8$ can operate at the SSU clock frequency (e.g., 5 times faster than the memory module clock frequency) such that for every read operation from memory device 1426 of FIG. 14 (e.g., to transfer a Gaussian probability distribution to distance calculator 1436), a distance score associated a Gaussian probability distribution (also referred to herein as "Gaussian distance score") is outputted from distance calculator 1436 to addition module 1438.

In an embodiment, datapath MUX 1610 is configured to distribute feature vector information associated with one dimension, a mean value associated with a corresponding dimension of a Gaussian probability distribution, a variance value associated with the corresponding dimension of the Gaussian probability, and feature vector scaling factors to each of ALU $1630_1$-$1630_8$. Based on the feature vector information and the feature vector scaling factors allocated to a respective ALU, each of ALUs $1630_1$-$1630_8$ is configured to generate a new feature vector by multiplying dimensions of the feature vector by respective scaling factors.

In an embodiment, the multiplication of the feature vector dimensions by the corresponding scaling factors is performed "on-the-fly," meaning that the multiplication operation is performed during the calculation of the distance score. This is, in contrast, to the multiplication operation being performed for each of the rows in a FVTM and the results of the multiplication operation being stored in memory to be later accessed by each of ALUs $1630_1$-$1630_8$. A benefit of the "on-the-fly" multiplication operation, among others, is that memory storage is not required for the results of the multiplication operation associated with non-indexed (or non-selected) rows of the FVTM. This, in turn, results in a faster generation of the new feature vector since additional clock cycles are not required to store the feature vector scaling results associated with the non-indexed rows in memory and also results in a smaller die size area for ALUs $1630_1$-$1630_8$.

Based on the new feature vector, the mean value, and the variance value for a respective ALU, each of ALUs $1630_1$-$1630_8$ is configured to calculate a distance score based on a feature vector dimension and a corresponding Gaussian probability distribution dimension per SSU clock cycle, according to an embodiment of the present invention. Cumulatively, in one clock cycle, ALUs $1630_1$-$1630_8$ generate distance scores for 8 dimensions (i.e., 1 dimension calculation per ALU). The architecture and operation of the ALU is described in further detail below.

The number of ALUs in distance calculator 1436 can be dependent on the SSU clock frequency and the memory module clock frequency discussed above such that distance calculator 1436 outputs a distance score for one Gaussian probability distribution for every read access to memory device 1426, according to an embodiment of the present invention. For example, the memory module clock frequency can have an operating frequency of 12 MHz, where memory device 1426 also operates at 12 MHz (e.g., for a read access of approximately 83 ns). SSU 1430 can have an SSU clock frequency of, for example, 60 MHz to operate five times faster than the memory module cock frequency. With a feature vector of 39 dimensions and 8 ALUs, a Gaussian distance score for one Gaussian probability distribution can be calculated in 5 SSU clock cycles or 1 memory module clock cycle. Therefore, by design, the 5 SSU clock cycles is a predetermined number of clock cycles that corresponds to 1 memory module clock cycle, where as one Gaussian probability distribution is read from memory device at 1 memory module clock cycle, a Gaussian distance score for another Gaussian probability distribution is calculated by accumulator 1640.

In an embodiment, a portion of ALUs $1630_1$-$1630_8$ can be activated on a rising edge of an SSU clock cycle, while the remaining portion of ALUs $1630_1$-$1630_8$ can be activated on a falling edge of the SSU clock cycle. For example, ALUs $1630_1$-$1630_4$ can be activated on the rising edge of the SSU clock cycle and ALUs $1630_5$-$1630_8$ can be activated on the falling edge of the SSU clock cycle. As a result of staggering the activation of ALUs $1630_1$-$1630_8$, the peak current (and peak power) generated by distance calculator 1436 can be minimized, thus decreasing the susceptibility of reliability issues in distance calculator 1436.

Based on the description herein, a person skilled in the relevant art will recognize that the architecture of distance calculator 1436 is not limited to the above example. Rather, as would be understood by a person skilled in the relevant art, distance calculator 1436 can operate at a faster or slower clock frequency of 60 MHz and that distance calculator 1436 can include more or less than 8 ALUs.

In reference to FIG. 16, accumulator 1640 is configured to receive the outputs from each of ALUs $1630_1$-$1630_8$ and the Gaussian weighting factor from datapath MUX 1610 (via data bus 1614). As discussed above, in an embodiment, for every SSU clock cycle, a distance score for a Gaussian probability distribution dimension is outputted by each of ALUs $1630_1$-$1630_8$. These distance scores from each of ALUs $1630_1$-$1630_8$ are stored and accumulated by accumulator 1640 to generate a distance score for the Gaussian probability distribution dimension, or Gaussian distance score—e.g., accumulator 1640 adds respective distance scores calculated by ALUs $1630_1$-$1630_8$ per SSU clock cycle.

After the Gaussian distance scores associated with all of the Gaussian probability distribution dimensions are accumulated in accumulator 1640 (e.g., 39 dimensions), accumulator 1640 multiplies the total sum by the Gaussian weighting factor to generate a weighted Gaussian distance score. In an embodiment, the Gaussian weighting factor is optional, where accumulator 1640 outputs the Gaussian distance score. In another embodiment, the Gaussian weighting factor is specific to each Gaussian and is stored in memory device 1426.

Addition module 1438 is configured to add one or more Gaussian distance scores (or weighted Gaussian distance scores) to generate a senone score. As discussed above, each senone can be composed of one or more Gaussian probability distributions, in which each Gaussian probability distribution can be associated with a Gaussian distance score. For a senone with a plurality of Gaussian probability distributions (e.g., 32 Gaussian probability distributions), addition module 1438 sums the Gaussian distance scores associated with all of the Gaussian probability distributions to generate the senone score. In an embodiment, addition module 1438 is configured to perform the summation operation in the log domain to generate the senone score.

Output buffer 1432 is configured to receive a senone score from addition module 1438 and transfer the senone score to bridge controller 1428. Bridge controller 1428, in turn, transfers the senone score to the external CPU via bus controller 1422. In an embodiment, output buffer 1432 can include a plurality of memory buffers such that, as a first senone score in a first memory buffer is being transferred to bridge controller 1428, a second senone score generated by addition module 1438 can be transferred to a second memory buffer for a subsequent transfer to bridge controller 1428.

Figure 17:
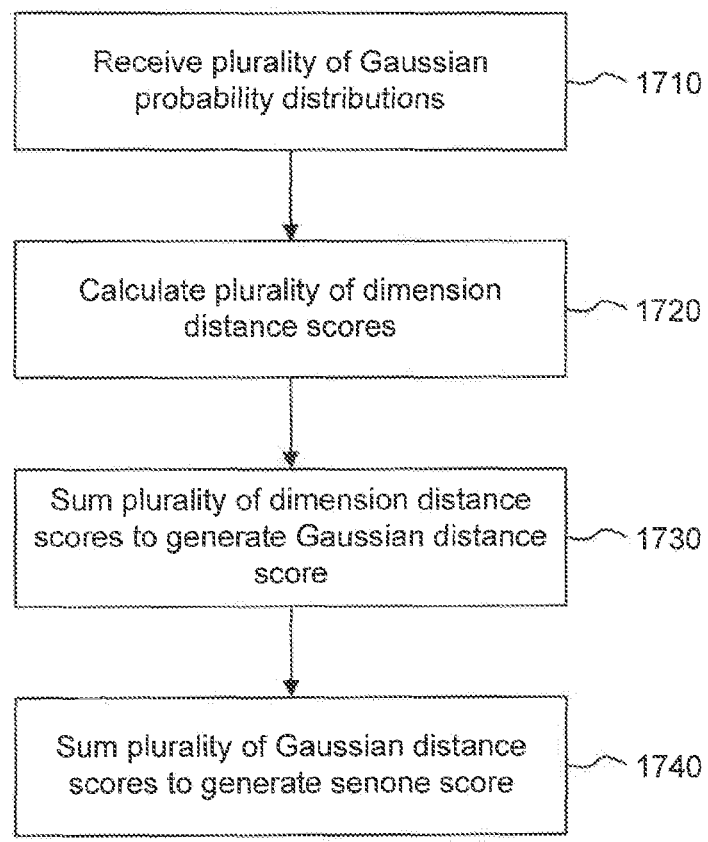
FIG. 17 is an illustration of an embodiment of a method of an acoustic modeling process for an Acoustic Processing Unit (APU).

FIG. 17 is an illustration of an embodiment of a method 1700 for acoustic modeling. The steps of method 1700 can be performed using, for example, APU 1400 of FIG. 14.

In step 1710, a plurality of Gaussian probability distributions is received via a data bus having a width of at least one Gaussian probability distribution and a feature vector from an external computing device. The Gaussian probability distribution can be composed of, for example, 768 bits, where the width of the data bus is at least 768 bits. Further, APU 1400 of FIG. 14 can receive the feature vector from the external computing device (e.g., a CPU in communication with APU 1400 via I/O signals 1410 of FIG. 14).

In an embodiment, information associated with a plurality of dimensions of the feature vector, a plurality of mean values associated with the corresponding plurality of dimensions of the at least one Gaussian probability distribution, and a plurality of variance values associated with the corresponding plurality of dimensions of the at least one Gaussian probability distribution are distributed to, for example, arithmetic logic units (e.g., ALUs $1630_1$-$1630_8$ of FIG. 16).

In step 1720, a plurality of dimension distance scores is calculated based on a plurality of dimensions of the feature vector and a corresponding plurality of dimensions of the at least one Gaussian probability distribution. In an embodiment, the distance score calculations are based on at least one senone from an active senone list. The active senone list can include a base address associated with an address space of a memory device and one or more indices related to the base address at which the at least one senone is located in the memory device. Further, a plurality of scaling factors for the plurality of dimensions of the feature vector are stored, where the plurality of scaling factors are applied to the plurality of dimensions of the feature vector during the calculation of the plurality of dimension distance scores. Step 1720 can be performed by, for example, distance calculator 1436 of FIG. 14.

In step 1730, the plurality of dimension distance scores are summed to generate a Gaussian distance score for the at least one Gaussian probability distribution. In an embodiment, the Gaussian distance score is generated over a predetermined number of senone scoring unit (SSU) clock cycles. The predetermined number of SSU clock cycles can equate to a read access time of the at least one Gaussian probability distribution from a memory device. Step 1730 can be performed by, for example, distance calculator 1436 of FIG. 14.

In step 1740, a plurality of Gaussian distance scores corresponding to the plurality of Gaussian probability distributions is summed to generate a senone score. Step 1740 can be performed by, for example, distance calculator 1436 of FIG. 14.

Embodiments of the present invention address and solve the issues discussed above with respect to conventional speech recognition system 200 of FIG. 3. In summary, the acoustic modeling process is performed by, for example, APU 1400 of FIG. 14. The APU operates in conjunction with a CPU, in which the APU can receive one or more feature vectors (e.g., feature vectors 315 of FIG. 3) from the CPU, calculate a senone score (e.g., senone score 325 of FIG. 3) based on one or more Gaussian probability distributions, and output the senone score to the CPU. In an embodiment, the one or more Gaussian probability distributions can be stored in the APU. Alternatively, in another embodiment, the one or more Gaussian probability distributions can be stored externally to the APU, in which the APU receives the one or more Gaussian probability distributions from an external memory device. Based on embodiments of the APU architecture described above, an accelerated calculation for the senone score is achieved.

5. Arithmetic Logic Unit Architecture

Figure 18:
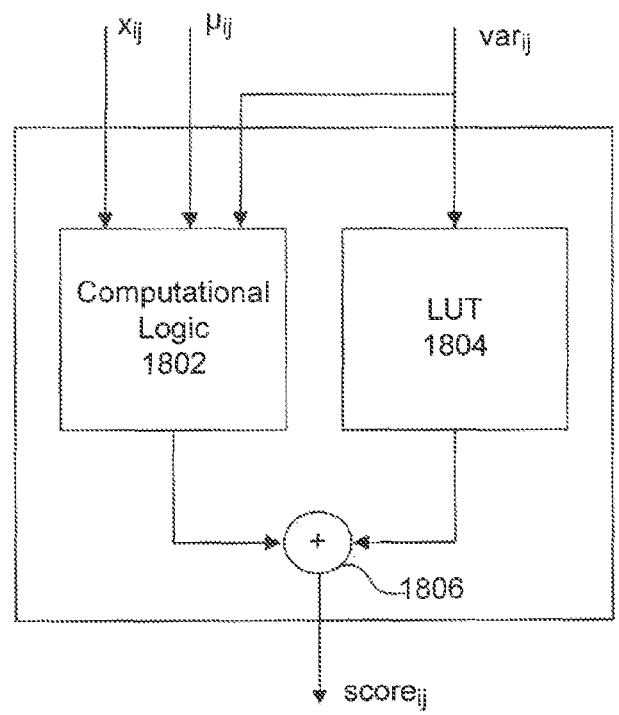
FIG. 18 is an illustration of an embodiment of an arithmetic logic unit, according to an embodiment of the present invention.

FIG. 18 is a block diagram of an ALU 1800, according to an embodiment of the present invention. In an embodiment, one or more of ALUs $1630_1$-$1630_8$ can be implemented according to the architecture shown in FIG. 18. ALU 1800 is configured to compute a one-dimensional distance score between a feature vector and a Gaussian probability distribution vector. For example, ALU 1800 can be configured to compute the one-dimensional distance score as, $$\text{score} = M_1 \times (\ln(\text{var}_{ij}) - C) + \left[\frac{\Delta_{ij}}{\text{var}_{ij}}\right]^2 \times M_2, \quad (1)$$

where:

$\Delta_{ij} = x_i - \mu_{ij}$, $\text{var}_{ij}$, is the variance value of the $i^{th}$ dimension of the $j^{th}$ Gaussian probability distribution vector;

$M_1$ and $M_2$ are scaling factors;

C is a constant;

$x_i$ is the value of the feature vector in the ith dimension; and $\mu_{ij}$ is the mean value of the ith dimension of the jth Gaussian probability distribution vector.

Thus, in an embodiment, for a given dimension and a given Gaussian probability distribution, the one-dimensional distance score output by ALU 1800 is dependent on three variables: $x_i$, $\mu_{ij}$, and $\text{var}_{ij}$. One technique for implementing this equation in software is to generate a look up table (LUT) that is indexed with these three variables. Moreover, because the score does not specifically depend on the values of $x_i$ and $\mu_{ij}$, but rather the difference between them, $\Delta_{ij}$, this LUT can be further simplified into a two-dimensional LUT indexed by the $\Delta_{ij}$ and $\text{var}_{ij}$. Thus, a two-dimensional LUT could be used to implement ALUs $1630_1$-$1630_8$.

A two-dimensional LUT, however, could have substantial drawbacks if used to implement ALUs $1630_1$-$1630_8$ in the hardware implementation of FIG. 16. In particular, for example, because there are eight ALUs $1630_1$-$1630_8$ that each compute a respective one-dimensional distance score, there would have to be eight copies of this two-dimensional LUT. In one embodiment, such a two-dimensional LUT is approximately 32 Kbytes, although other embodiments and applications may require larger LUTs. Thus, in such an embodiment, eight copies of a 32 Kbyte LUT would be needed. If implemented in such a manner, a large amount of the total board space for the SSU would be allocated to only the eight two-dimensional LUTs. This problem would be exacerbated if larger LUTs were required or desired.

In an embodiment, ALU 1800 overcomes this drawback of two-dimensional LUTs by implementing a scoring function using a combination of computational logic and a one-dimensional LUT. Importantly, Equation (1) can be split into two parts: an $\text{alu}_{ij}$ part and a $\text{LUT}_{ij}$ part, with each specified below.

$$\text{alu}_{ij} = \left[\frac{\Delta_{ij}}{\text{var}_{ij}}\right]^2 \times M_2 \quad (2)$$

$$\text{LUT}_{ij} = M_1 \times (\ln(\text{var}_{ij}) - C) \quad (3)$$

Thus, ALU 1800 computes $\text{alu}_{ij}$ and, in parallel with the computing, retrieves $\text{LUT}_{ij}$. The $\text{alu}_{ij}$ and $\text{LUT}_{ij}$ are then combined to form the distance score. In particular, as shown in FIG. 18, ALU 1800 includes a computational logic unit 1802 and a LUT module 1804. As described in further detail below, computational logic unit 1802 can compute value $\text{alu}_{ij}$ and LUT module 1804 can be used to retrieve value $\text{LUT}_{ij}$. Moreover, ALU 1800 additionally includes a combination module 1806. Combination module 1806 combines the outputs of computational unit 1802 and LUT module 1804 and outputs the distance score.

Computational logic unit 1802 and LUT module 1804 only receive the inputs that are needed to determine their respective value. Specifically, as described above, $\text{alu}_{ij}$ depends on three variables: $x_i$, $\mu_{ij}$, and $\text{var}_{ij}$. Thus, as shown in FIG. 18, computational logic unit 1802 receives these three values as inputs. Moreover, the values retrieved from LUT module 1804 are indexed using value $\text{var}_{ij}$ alone. Thus, as shown in FIG. 18, LUT module 1804 only receives value $\text{var}_{ij}$.

Figure 19:
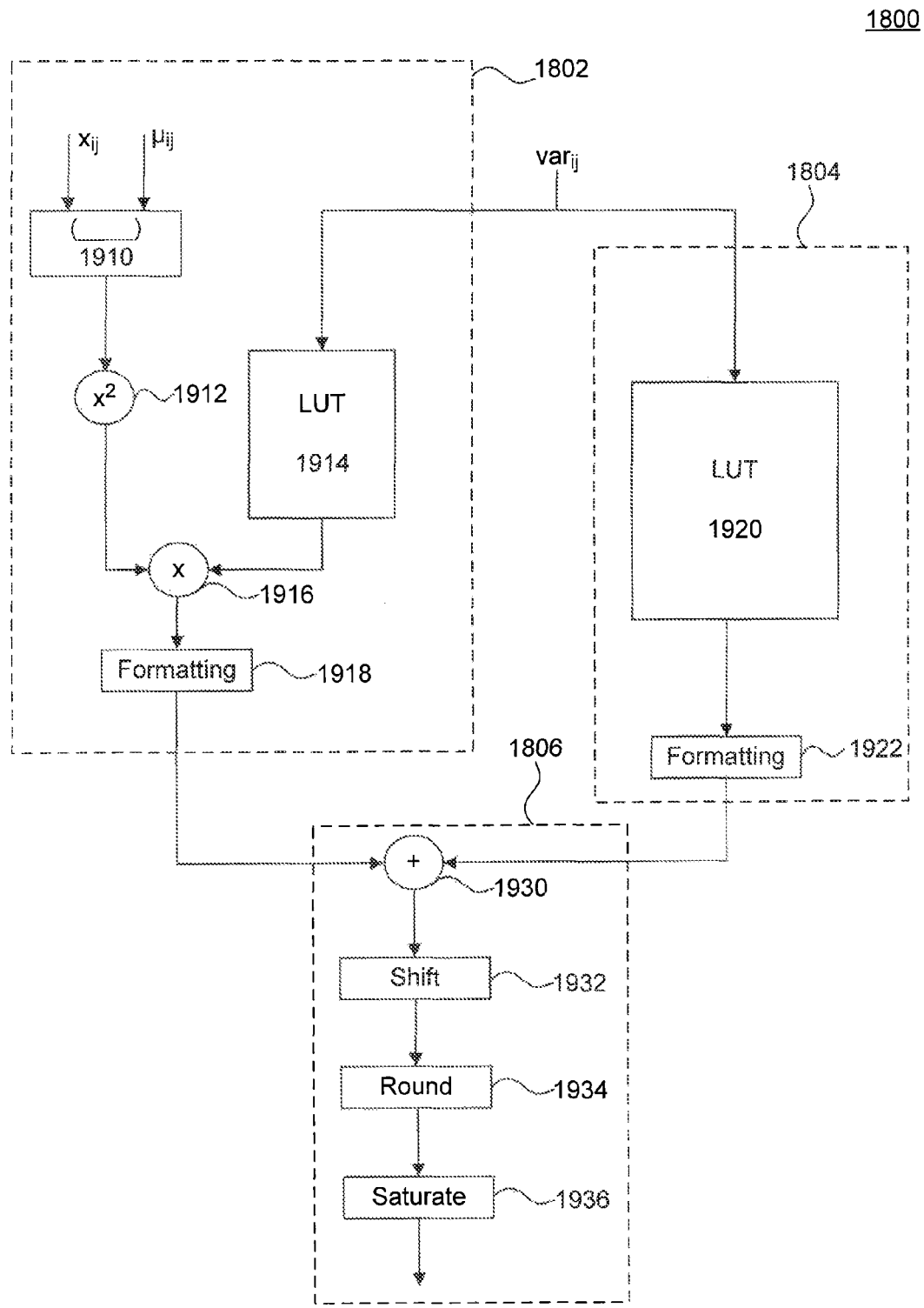
FIG. 19 is an illustration of an embodiment of the arithmetic logic unit shown in FIG. 18, according to an embodiment of the present invention.

FIG. 19 shows a detailed block diagram of ALU 1800, according to an embodiment of the present invention. In the embodiment of FIG. 19, computational logic unit 1802 includes a subtraction module 1910, a squaring module 1912, a LUT 1914, a multiplier 1916, and a formatting module 1918. Subtraction module 1910 computes the difference between $x_i$ and $\mu_{ij}$, i.e., subtraction module 1918 computes $\Delta_{ij}$. Squaring module 1912 squares the difference output by subtraction module 1910 generating an integer representing $\Delta_{ij}^2$.

In an embodiment, LUT 1914 outputs a value that corresponds to $$M_1 \times \left[\frac{1}{\text{var}_{ij}}\right]^2.$$

Multiplier 1916 computes a product of two terms: (1) the value retrieved from LUT 1914 and (2) the square output by squaring module 1912. Thus, the output of multiplier 1916 is $$\left[\frac{\Delta_{ij}}{\text{var}_{ij}}\right]^2 \times M_2.$$

This product value is received by formatting module 1918, which formats the result so that it can be effectively combined with the output of LUT module 1804.

As shown in FIG. 19, LUT module 1804 includes a LUT 1920 and a formatting module 1922. LUT 1920 stores values corresponding to $\text{LUT}_{ij}$, as expressed in Equation (3), and is indexed using $\text{var}_{ij}$. The value retrieved from LUT 1920 is received by formatting module 1922. Formatting module 1922 formats the output of LUT 1920 so that it can be effectively combined with the output of computational logic unit 1802.

The outputs from computational unit 1802 and LUT module 1804 are received at combination module 1806. Combination module 1806 includes an adder 1930, a shift module 1932, a rounding module 1934, and a saturation module 1936. Adder 1930 computes the sum of the two received values and outputs the sum. Shift module 1932 is configured to remove the fractional portion of the sum output by adder 1930. Rounding module 1934 is configured to round down the output of shift module 1934. Saturation module 1936 is configured to receive the rounded sum and saturate the value to a specific number of bits. Thus, the output of saturation module 1936 is a value having a specific number of bits that represents the one-dimensional distance score.

Figure 20:
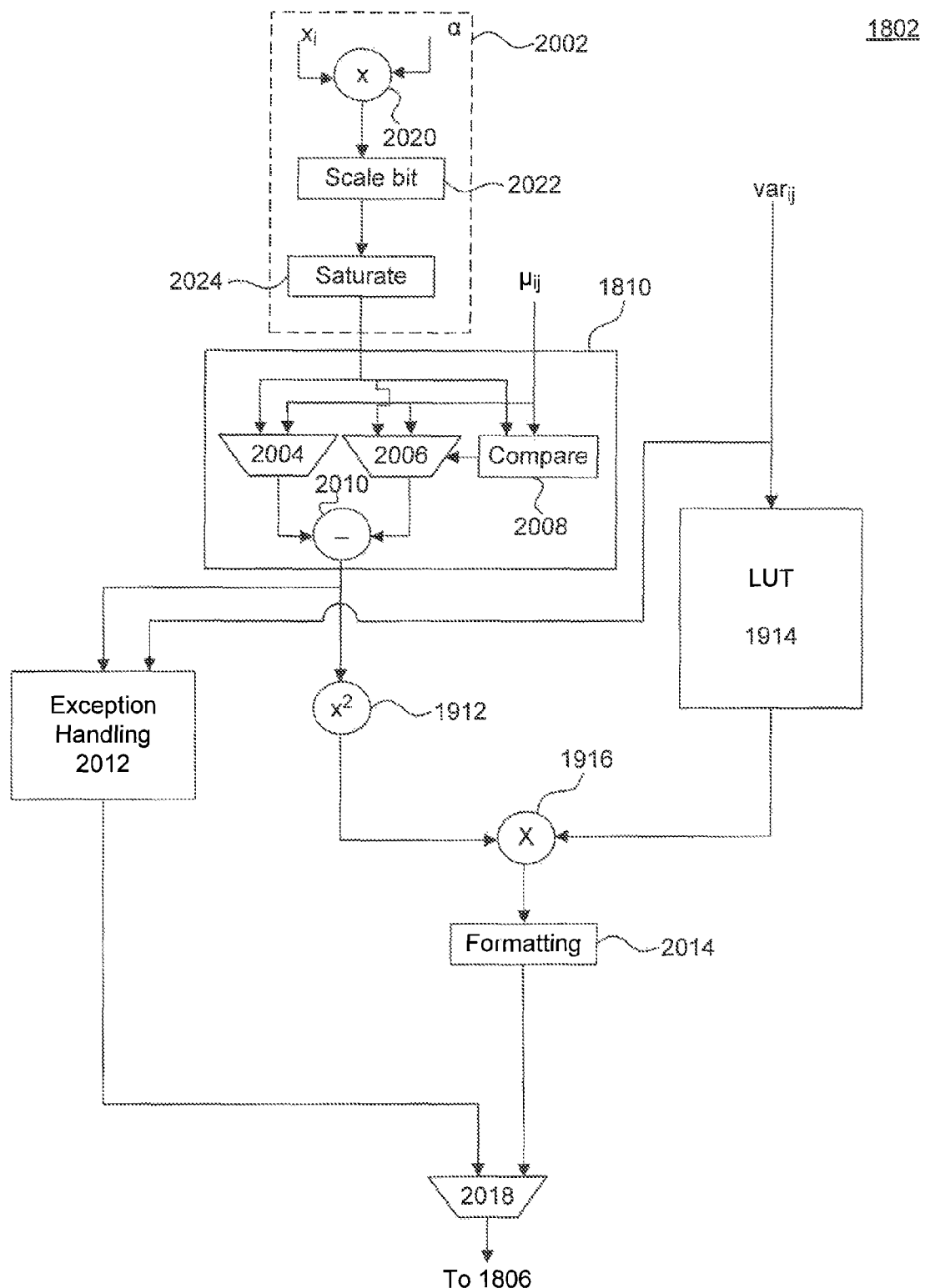
FIG. 20 is an illustration of an embodiment of a computational unit, according to an embodiment of the present invention.

FIG. 20 is a block diagram of computational unit 1802, according to another embodiment of the present invention. The embodiment shown in FIG. 20 is similar to the embodiment of FIG. 19, except that the embodiment of FIG. 20 additionally includes a transform module 2002, an exception handling module 2012, a formatting module 2014, and a multiplexer 2018.

Transform module 2002 includes a multiplier 2020, a scale bit module 2022, and a saturation module 2024. As described above, values of feature vector can be transformed by respective entries in a feature vector transform matrix to, for example, account for learned characteristics of a speaker. In an embodiment, transform module 2002 can be configured to scale individual feature vector values $x_i$ by corresponding transform values $\alpha_i$. Specifically, multiplier 2020 computes a product of the feature vector value $x_i$ and the corresponding transform value $\alpha_i$ and outputs a value to scale bit module 2022. Scale bit module 2022 shifts to the right and outputs the resulting integer to saturation module 2024. Saturation module 2024 is similar to saturation module 1936, described with reference to FIG. 19, saturates the received value to a specific number of bits. Thus, the output of saturation module 2024 is a value that represents the scaled feature vector value.

Exception handling module 2012 and multiplexer 2018 are configured to address specific errors present in LUT 1914. For example, in an effort to save space, the size of LUT 1914 can be reduced. This reduction in size can cause specific values of LUT 1914 to have an error. In such an embodiment, exception handling module 2012 can recognize if the output of LUT 1914 will be one of those values, and output the correct value. Put another way, exception handling module 2012 can act as a LUT that includes an entry for each entry of LUT 1914 that may have an error due to size restrictions. Because LUT 1914 is indexed based on $var_{ij}$, exception handling module 2012 can recognize whether the output of LUT 1914 needs to be corrected based on the value of $var_{ij}$.

In a further embodiment, exception handling module 2012 can act as a two-dimensional LUT that also receives $\Delta_{ij}$. In such an embodiment, exception handling module 2012 can output specific values of $alu_{ij}$ (e.g., as opposed to the corresponding entry from LUT 1914). Because the number of these possible errors in LUT 1914 is relatively small, exception handling module 2012 does not occupy a significant amount of space, as would other, larger two-dimensional LUTs. Furthermore, by controlling multiplexer 2018 to output the output of exception handling module 2012 instead of the output of sign bit module 1918, exception handling module 2012 can ensure that the stored value for $alu_{ij}$ rather than the value of $alu_{ij}$ calculated using the incorrect output of LUT 1914 is finally output to combination module 1806.

Formatting module 2014 receives the product computed by multiplier 1916. In an embodiment, formatting module 2014 is configured to reduce the number of bits in the result. While not necessary, this operation can save space and power by reducing the number of bits on the output.

Moreover, the embodiment of FIG. 20 shows subtraction module 1810 as including multiplexers 2004 and 2006, comparison module 2008, and a subtractor 2010. In an embodiment, squaring module 1912 may be configured to square specifically positive values. Thus, the output of subtraction module 1910 in such an embodiment must be positive. To achieve this result, the two operands, i.e., the feature vector value (optionally scaled with transform value $\alpha_i$) and the mean value $\mu_{ij}$ can be compared by comparison module 2008. Comparison module 2008 then outputs a control signal to multiplexers 2004 and 2006 to ensure that the first operand into subtractor 2010 is at least as large as the than the second operand.

Figure 21:
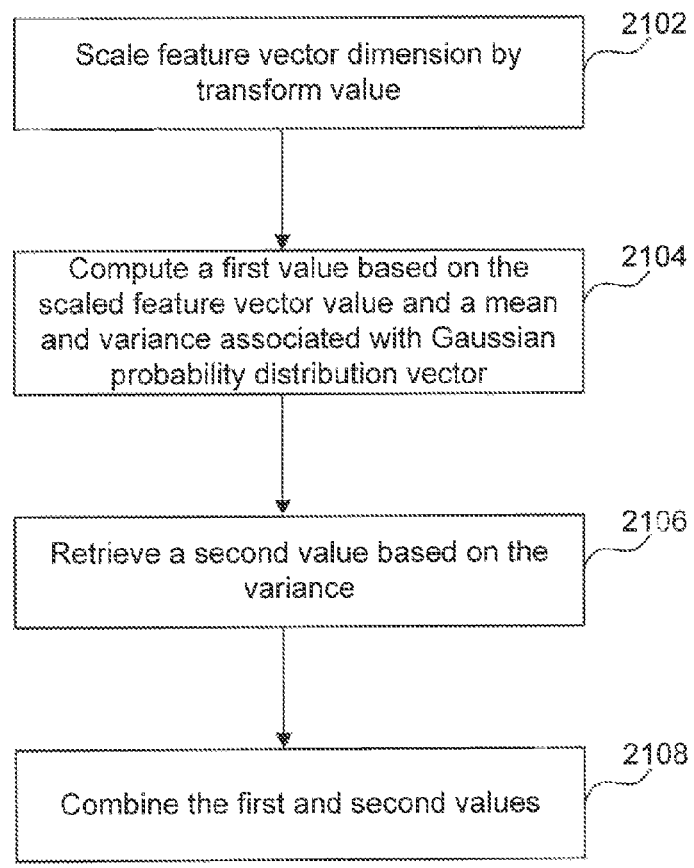
FIG. 21 is an illustration of an embodiment of a method for computing a one-dimensional distance score.

FIG. 21 is an illustration of an embodiment of a method 2100 for computing a one-dimensional distance score. The steps of method 2100 can be performed using, for example, ALU 1800 shown in FIG. 18. In step 2102, a feature vector dimension is scaled by a transform value. In step 2104, a first value is computed based on the feature vector value and a mean and a variance associated with a Gaussian probability distribution vector. In step 2106, a second value is retrieved based on the variance value. For example, in FIG. 19, LUT module 1804 can be used to retrieve variance value. In step 2108, the first and second values are combined to generate the one-dimensional score.

6. Acoustic Processing Unit Interface

A. System Overview

Figure 22:
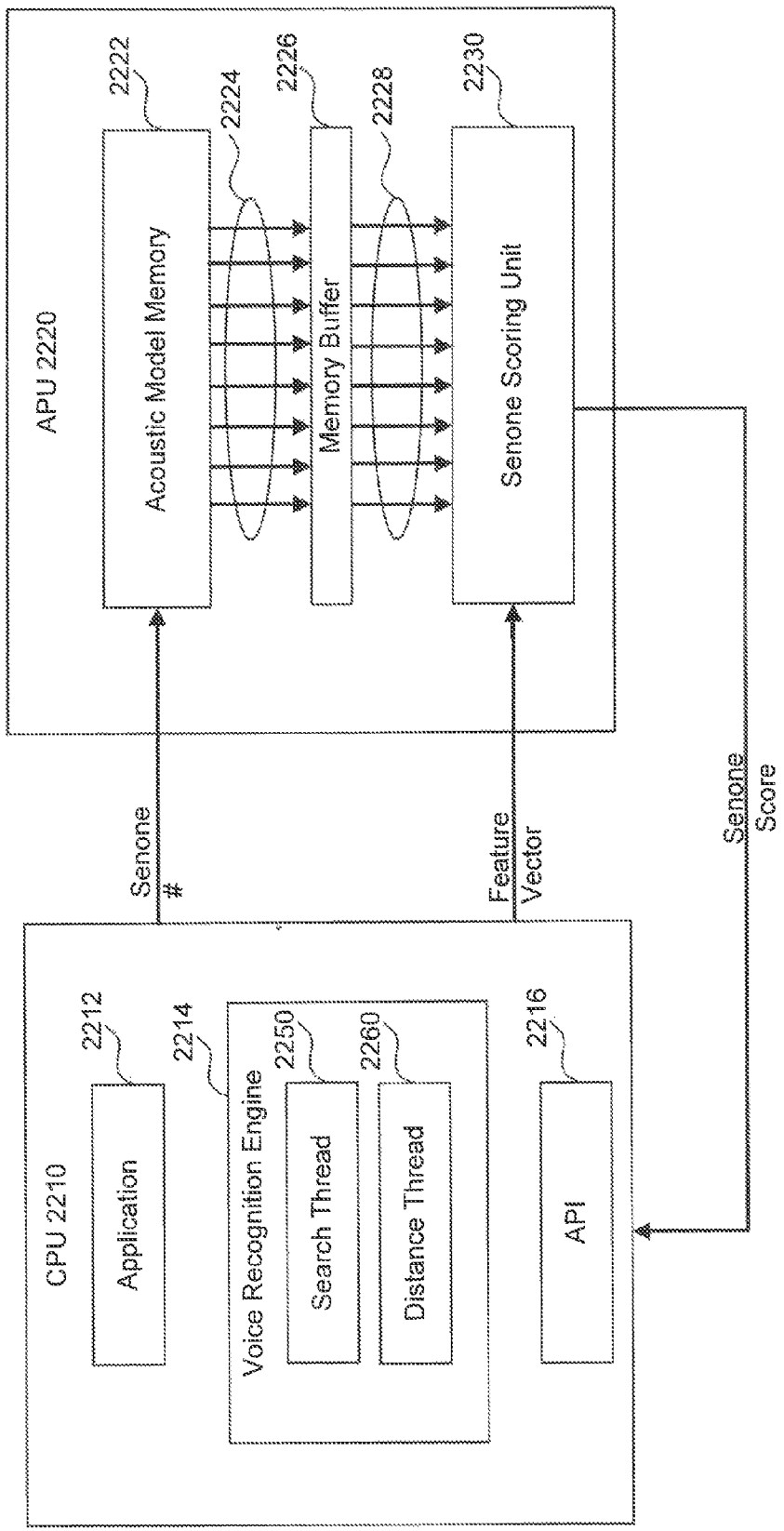
FIGS. 22 and 23 are illustrations of embodiments of an acoustic processing system.

FIG. 22 is a block diagram of an acoustic processing system 2200, according to an embodiment of the present invention. Acoustic processing system includes a central processing unit (CPU) 2210 and an acoustic processing unit (APU) 2220. Running on CPU 2210 are an application 2212, a voice recognition engine 2214, and an API 2216. Voice recognition engine 2214 is a process that includes at least two threads: a search thread 2250 and a distance thread 2260.

APU 2220 includes an acoustic model memory 2222, a first bus 2224, a memory buffer 2226, a second bus 2228, and a senone scoring unit 2230. Acoustic model memory 2222 can be configured to store a plurality of senones that together form one or more acoustic models. First bus 2224 is a wide bus that is configured to allow acoustic model memory to output an entire Gaussian probability distribution vector to memory buffer 2226. Senone scoring unit 2230 scores a senone score against a feature vector received from CPU 2210. Senone scoring unit 2230 can be implemented as described above. For example, senone scoring unit can be implemented as shown in FIG. 15. For more information on senone scoring unit 2230, see Section 4, above.

Memory buffer 2226 can hold a Gaussian probability distribution vector until senone scoring unit 2230 is ready to compute a Gaussian distance score for it. That is, if senone scoring unit 2230 is scoring a feature vector received from CPU 2210 against a Gaussian probability distribution vector q, memory buffer 2226 can hold the next Gaussian probability distribution vector to be scored, i.e., vector q+1.

As shown in FIG. 22, the inputs to APU 2220 include a reference to a specific senone (senone #) and the feature vector. The senone # input addresses the stored vector information corresponding to that particular senone in the acoustic model memory. The output of APU 2220 is the senone score, which represents the probability that the referenced senone emits the feature vector in a given time frame. In an embodiment, acoustic model memory 2222 utilizes a parallel read architecture and a very large internal bandwidth bus 2224. The number of bits read in parallel is greater than 256 (e.g., 768 bits wide—sufficient to load an entire Gaussian probability distribution vector at once). The values read from the acoustic model memory 2222 are then latched into memory buffer 2226, using very large bandwidth bus 2224. Both of the output from memory buffer 2226 and the observation vector information are input into senone scoring unit 2230 which performs the multiplications and additions required to compute the senone score. Bus 2228, over which memory buffer 2226 communicates with senone scoring unit 2230, is substantially similar to bus 2224.

As noted above, the senone score is computed by calculating the scores of the J Gaussian probability distribution vectors of dimension N, and by then summing them together to get the total score. Some scoring algorithms, however, use only the most significant Gaussians in the calculation to increase the speed of the computation. When utilizing algorithms based on a partial set of Gaussians, only those bits associated with the required Gaussians need to be transferred from the acoustic model memory to senone scoring unit 2230. In other words, the largest number of contiguous bits in memory which will always be required by senone scoring unit 2230 is equal to the number of bits used to store a single Gaussian probability distribution vector. The bandwidth requirements of the memory bus as well as the number of bits that need to be read in parallel with be minimized by transferring only those bits comprising a single Gaussian probability distribution vector in each transfer. Using this number of bits per transfer, the power requirements of APU 2220 can be reduced and the transfer rate of the necessary data to senone scoring unit 2230 will be increased, resulting in an improvement of the overall system performance. Put another way, by reducing the number of bits per transfer, the power requirements of APU 2220 can be reduced and the transfer rate of the necessary data to senone scoring unit 2230 can also be increased, resulting in an improvement of the overall system performance.

As discussed above, acoustic modeling is one of the major bottlenecks in many types of speech recognition system (i.e., keyword recognition, or large vocabulary continuous speech recognition). Because of the large number of comparisons and calculations, high performance and/or parallel microprocessors are commonly used, and a high bandwidth bus between the memory storing the acoustic models and the processors is required. In the embodiment of FIG. 22, the acoustic model memory 2222 can be incorporated into APU 2220, which is integrated into a single die with senone scoring unit 2230, with both of them connected using a wide, high bandwidth internal buses 2224 and 2228 to improve the data transfer rate. However, while increasing the number of bits per transfer does improve the data transfer rate, it does not always improve the overall system performance.

The number of bits per transfer can also a function of the algorithms used for acoustic modeling. When scoring algorithms based on a partial set of Gaussians are used (i.e. Gaussian Selection) then the number of bits per transfer can be equal to the size of the Gaussian used by the algorithm. Fewer number of bits per transfer requires multiple cycles to transfer the data comprising the Gaussian, while greater numbers of bits per transfer is inefficient due to data non-locality.

In an embodiment, an architecture is used for acoustic modeling hardware accelerators when scoring algorithms are used is at least partially based on a partial set of Gaussians (i.e., Gaussian Selection). This optimized architecture can result in a significant improvement in the overall system performance compared to other architectures.

Figure 23:
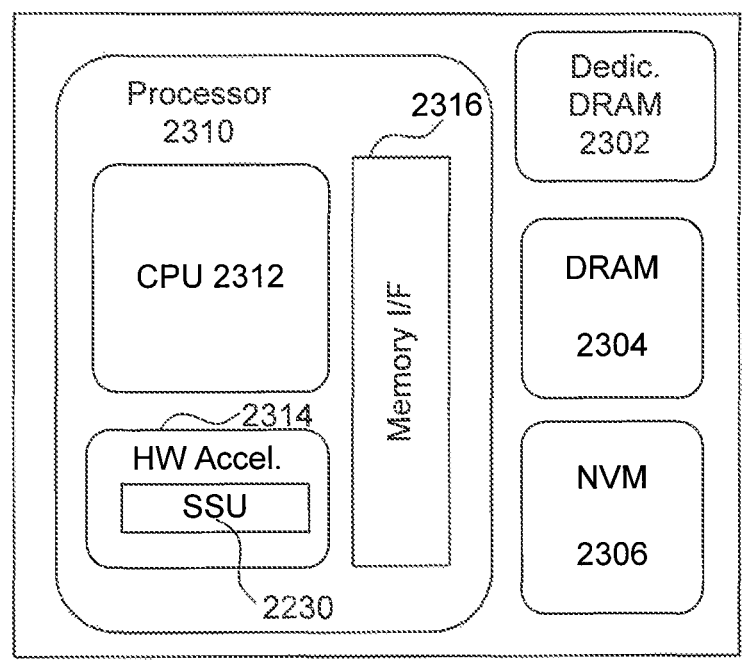

FIG. 23 is a block diagram of an acoustic processing system 2300, according to an embodiment of the present invention. Acoustic processing system 2300 includes a processor 2310, a dedicated DRAM module 2302, a DRAM module 2304, and a non-volatile memory module 2306. Non-volatile memory module 2306 can be implemented as, e.g., an embedded FLASH memory block. Processor 2310 includes a CPU 2312, a hardware accelerator 2314, and a memory interface 2316. Hardware accelerator 2314 includes a senone scoring unit 2320. Senone scoring unit 2320 can be implemented as described above. For example, senone scoring unit can be implemented as shown in FIG. 15.

In an embodiment, dedicated DRAM module 2302 is dedicated to senone scoring unit 2320 to, for example, store senones. Thus, memory interface 2316 can couple senone scoring unit 2320 to dedicated DRAM 2302.

Figure 24:
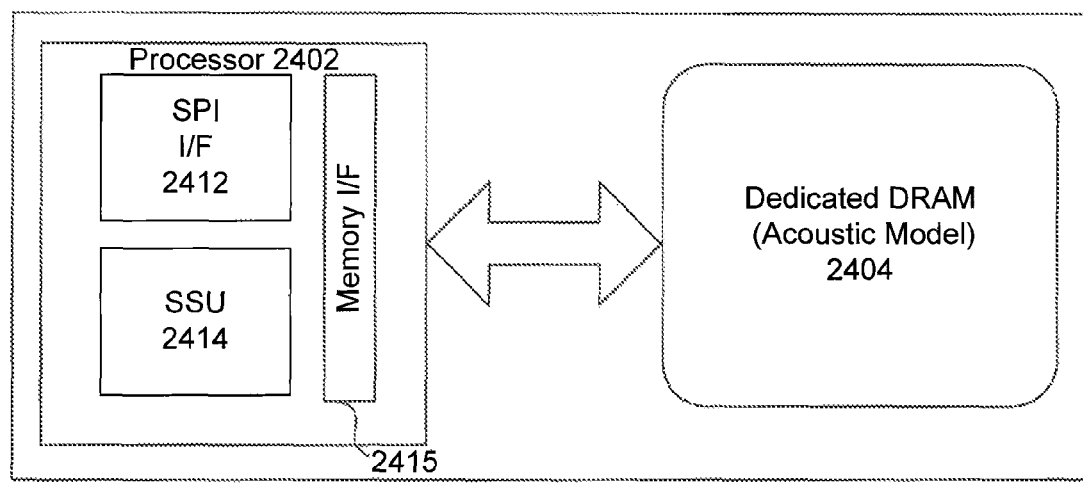
FIG. 24 is an illustration of an embodiment of a hardware accelerator.

FIG. 24 is a block diagram of a hardware accelerator 2400, according to an embodiment of the present invention. Hardware accelerator 2400 includes a processor 2402 and a dedicated DRAM module 2404. Processor 2402 includes a serial peripheral interface (SPI) bus interface module 2412, a senone scoring unit 2414, and a memory interface 2416. Senone scoring unit 2414 can be implemented as described above (e.g., as shown in FIG. 15). As shown in FIG. 24, dedicated DRAM module 2404 stores one or more acoustic models. In an alternate embodiment, DRAM module 2404 can instead be a non-volatile memory module, e.g., a FLASH memory module. In still another embodiment, DRAM module 2404 can instead be a memory module that includes a volatile memory module (e.g., DRAM) and a non-volatile memory module (e.g., FLASH). In such an embodiment, the acoustic model can initially be stored in the non-volatile memory module and can be copied to the volatile memory module for senone scoring.

SPI interface module 2412 can provide an interface to an SPI bus, which, in turn, can couple hardware accelerator 2400 to a CPU. Memory interface 2416 couples senone scoring unit 2414 to dedicated DRAM module 2404. In an embodiment, a voice-recognition system can be implemented in a cloud-based solution in which the senone scoring and processing necessary for voice-recognition is performed in a cloud-based voice-recognition application.

B. Software Stack

Figure 25:
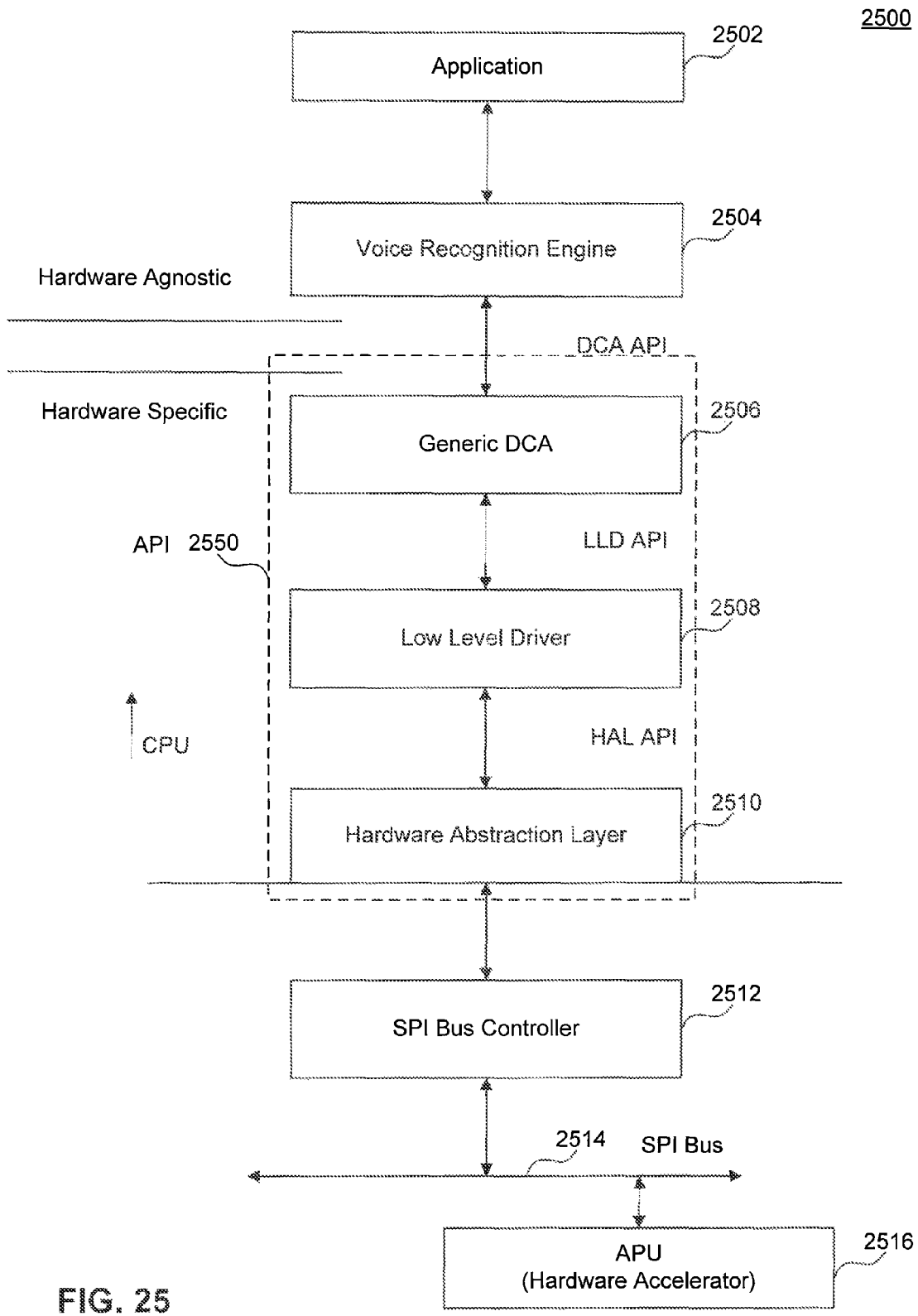
FIG. 25 is a block diagram illustrating an APU software stack.

FIG. 25 is a block diagram illustrating an APU software stack 2500, according to an embodiment of the present invention. Software stack 2500 can be used to conceptually illustrate the communications between components in an acoustic processing system, e.g., acoustic processing system 2200 described with reference to FIG. 22. Stack 2500 includes an application 2502, a voice recognition engine 2504, an application programming interface (API) 2550, an SPI bus controller 2512, an SPI bus 2514, and an APU 2516. API 2550 includes a Generic DCA 2506, a low level driver (LLD) 2508, and a hardware abstraction layer (HAL) 2510. In an embodiment, application 2502, voice recognition engine 2504, API 2550, and APU 2516 can correspond to application 2212, voice recognition engine 2214, API 2216, and APU 2220 of FIG. 22, respectively.

In software stack 2500, application 2502 communicates with voice recognition engine 2504, which in turn, communicates with Generic DCA 2506. In an embodiment, voice recognition engine 2504 is coupled to the Generic DCA 2506 via a DCA API. Generic DCA 2506 can be coupled to LLD 2508 via a LLD API. LLD 2508 can be coupled to HAL 2510 via an HAL API. HAL 2510 is communicatively coupled to SPI Bus Controller 2512 which is communicatively coupled to SPI bus 2514. APU 2516 is communicatively coupled to SPI bus 2514 and is communicatively coupled to the HAL 2510 via bus controller 2512 and SPI bus 2514.

In an embodiment, software stack 2500 provides a software interface between APU 2516 and application 2502 (e.g., an application that employs voice recognition). In particular, application 2502 and voice recognition engine 2504 can be "hardware agnostic." That is, the application 2502 and voice recognition engine 2504 can complete their respective operations without detailed knowledge about how the distance, or senone, scoring is taking place.

Generic DCA 2506, LLD layer 2508, and HAL layer 2510 include hardware-specific API calls. In an embodiment, the API calls of HAL 2510 depend on the type of controller to which it is connected. In an embodiment, the bus interface for APU 2516 can be a different bus and controller combination, requiring a different HAL (with different API calls).

Generic DCA 2506 is a distance computational API. The DCA can be defined by a software developer. In an embodiment, the DCA API is specifically defined to support a voice recognition engine, such as voice recognition engine 2504. Also, Generic DCA 2506 can be implemented specifically for APU 2516. Moreover, LLD 2508 can be a functional abstraction of the senone scoring unit commands and can be a oneto-one mapping to the senone scoring unit commands. As shown in FIG. 25, low-level driver 2508 is coupled to HAL 2510.

The DCA API can include the following five functions: Create, Close, Set Feature, Compute Distance Score, and Fill Scores. In an embodiment, the Create function specifies which acoustic model is to be used. There can be one or more acoustic models stored in memory (e.g., one or more acoustic models for each language). For example, as discussed above with reference to FIG. 22, dedicated acoustic model memory 2222 of APU can store the acoustic model (e.g., senone library(s)). Moreover, given an acoustic model (e.g., a library of senones that stores the Gaussian distribution of the sound corresponding to the various senones) and a feature vector, the Create function can specify the number of dimensions in the feature vector. In an embodiment, for English the feature vector can have 39 dimensions. In another embodiment, for other languages, the feature vector can have another number of dimensions. More generally, the number of dimensions can vary depending on the specific spoken language selected for voice recognition processing. Thus, the Create function specifies the acoustic model selected, number of dimensions, and number of senones. The Close function is a function that ends delivery of feature vectors, audio sample portions, and senone scoring requests to the hardware accelerator (e.g., APU 2516).

In an embodiment, the Set Feature function is used to set the senone scoring requests into their respective frames by passing a specific frameID, a passID, and the feature vector. As noted above, the input audio signal can be broken up into frames (e.g., by voice recognition engine 2504). An exemplary frame comprises spectral characteristics of a portion of the audio input signal. In an embodiment, a frame can be 12 milliseconds (ms) long. The Set Feature function can convert each frame into 39 dimensions (e.g., 39 8-bit values). The Set Feature function can specify a particular frame's ID and the associated feature vector.

In an embodiment, the Distance Compute Score function calculates the senone score (e.g., Gaussian probability), which, as noted above, can be implemented as a distance calculation. This function can be used to begin and prepare the senone scoring. For example, the feature vector can be input into APU 2516 and APU 2516 will score against all the senones stored in the acoustic model, or at least a selected portion of the senones. This score will then be given back to the upper layer. In an embodiment, the Distance Compute Score function can specify that a portion or the complete acoustic model will be used for the senone scoring.

In an embodiment, the Fill Scores function takes the senone scoring result and returns it to the upper software layers, including application 2502 and voice recognition engine 2504.

In an embodiment, voice recognition engine 2504 can be used for any form of pattern recognition, e.g., pattern recognition forms that use a Hidden Markov model for pattern recognition. In another embodiment, another form of pattern recognition also uses Gaussian calculations. Examples of pattern recognition can include, but are not limited to the above described senone scoring for speech recognition, image processing and handwritten recognition.

As noted above, application 2502 and voice recognition engine 2504 are agnostic to any hardware used to determine the senone score. In an embodiment, a particular APU can be swapped out for different hardware without application 2502 and voice recognition engine 2504 knowing or being effected. When application 2502 and voice recognition engine 2504 are agnostic to any type of hardware used for the senone scoring, a first hardware accelerator can be replaced with a second hardware accelerator of a different design without requiring any redesign of application 2502 and voice recognition engine 2504. In other words, as discussed herein, while the APU Library of calls are specific to the type and design of hardware accelerator used, the Generic DCA Library calls are not hardware specific.

In an embodiment, a software architecture, as illustrated in FIG. 25, can be described by describing a data and control flow through the software stack illustrated in FIG. 25. Application 2502 can be any application that uses the voice recognition engine. In an embodiment, voice recognition engine 2504 is the Vocon Engine provided by Nuance, Inc. In alternate embodiments, other speech recognition engines or pattern recognition engines that make use of a Gaussian Mixture Model (GMM) for probability estimation may be used.

In an embodiment, APU 2516 computes senone scores using the Gaussian Mixture Model. APU 2516 can compute these scores much faster (e.g., by an order of magnitude) than an embedded processor (e.g., a cortex A8 embedded processor) making speech recognition more practical in on-board speech recognition systems with APU 2516. Offloading the senone scoring (or distance computation) to APU 2516 not only improves the user experience (by reducing the computational latency) but also allows CPU 2210 to attend to other tasks in the system. The software architecture plays an important role in reducing the CPU load and the latency.

In an embodiment, voice recognition engine 2504 is not directly aware of APU 2516. For example, voice recognition engine 2504 can use Generic DCA API 2506 to compute the distances (also referred to as senone scores). The specific implementation of the Generic DCA library discussed here has been designed specifically to use APU 2516, with a plurality of function calls to the APU discussed below. This differs from a fully software implementation of the Generic DCA library. This specific implementation translates the Generic DCA library calls to a sequence of APU library calls. The details of the implementation are described below. The definition and implementation of the APU library is specific to the current implementation of the APU and is also described below.

In an embodiment, Generic DCA 2506 operates as an interface layer between the voice recognition engine 2504 and APU 2516. For example, voice recognition engine 2504 can utilize generic API calls to the Generic DCA to request senone scoring. Generic DCA 2506 then utilizes an APU-specific library of API calls, described further below, to direct the APU hardware accelerator to perform the requested senone scoring. Because voice recognition engine 2504 is not aware of APU 2516, voice recognition engine 2504 can take advantage of the following benefits. For example, voice recognition engine 2504 may only need to know the message passing formats of APU 2516. Voice recognition engine 2504 also does not need to know the tasks to be performed by APU 2516. Moreover, there is a swap-out benefit. That is, APU 2516 can be replaced or redesigned without requiring any redesign of voice recognition engine 2504. Only the interface, in this embodiment Generic DCA 2506, needs to have the hardware specific API calls to ensure the required interoperability between voice recognition engine 2504 and APU 2516.

In one exemplary embodiment, a Generic DCA Library comprises the following list of functions:
Function name: distance_computation_create
input parameters:
acoustic model.
number of dimensions in the feature vector.

total number of senones in the acoustic model.
description: stores these parameters as part of the state of distance computation.
Function name: distance_computation_setfeature
Input parameters:
Frame Id
feature vector
Description: store the feature vector corresponding to the frame Id.
Function name: distance_computation_computescores
Input parameters:
Frame Id
List of Senones to score
Description: specifies the senones to be scored for a given frame.
Function name: distance_computation_fillscores
Input parameters:
Buffer containing the scores
Description: store the senone scores in the buffer.
Function name: distance_computation_setfeaturematrix
Input parameters:
pMatrix
Description: stores the feature vector transformation matrix given by "pMatrix" in APU.

The distance_computation_setfeaturematrix function is called between utterances to adapt the recognition to the specific speaker. The APU uses this matrix when computing the senone scores for the next utterance.

In an embodiment, "distance_computation_computescores" and "distance_computation_fillscores" can be implemented such that the computational latency and the CPU load are minimized. For example, these functions can be implemented so as to achieve the concurrent operation embodied in FIG. 26.

In one exemplary embodiment, an APU Library supports the following functions:
Function name: apu_set_acoustic_model
Input parameters:
Acoustic model
Description: sets the acoustic model to be used for senone scoring.
Function name: apu_load_feature_vector
Input parameters:
Feature vector
Description: Loads the feature vector in to the APU.
Function name: apu_score_senone_chunk
Input parameters:
Senone list
Description: Loads the senone list in to the APU for scoring.
Function name: apu_score_range
Input parameters:
Range of senones specified by the first and last index
Description: Instructs APU to score all the senones in the range.
Function name: apu_read_senone_scores
Input parameters:
Number of scores to read
Destination buffer
Description: Reads the scores and stores in the destination buffer.
Function name: apu_check_score_ready_status
input parameters:
none
Description: Checks if the scores are ready to be read form the APU.
Function name: apu_read_score_length
Input parameters:
none
Description: Reads the status register to find the number of score entries available.
Function name: apu_read_status
Input parameters:
Register index
Description: Reads the status register specified by register index.
Function name: apu_read_configuration
Input parameters:
none
Description: Reads the configuration register.
Function name: apu_write_configuration
input parameters:
Configuration data
Description: Writes to the configuration register.

In an embodiment, the APU can be used for scoring the senones for each frame of a given utterance. The acoustic model of choice is communicated to the APU at the beginning as part of the function distance_computation_create. The feature vector for a given frame is passed to the APU via the function distance_computation_setfeature. The senones to be scored for a given frame are passed to the APU via the function distance_computation_computescores. The actual scores computed by the APU can be passed back to the Voice Recognition Engine engine via the function distance_computation_fillscores.

The control flows from top to bottom of stack 2500 illustrated in FIG. 25. All the functions are synchronous and they complete before returning except for the function distance_computation_computescores. As noted below, the scoring can be implemented as a separate thread to maximize the concurrency of distance computation and the search as described above. This thread yields the CPU to the rest of voice recognition engine 2214 whenever it is waiting for APU 2220 to complete the distance computation. This asynchronous computation is important to minimize the latency as well as the CPU load.

C. Concurrent Search and Distance Score Computation

In one embodiment, a thread (e.g. an executable process) separate from a thread that is being executed by application 2502 or voice recognition engine 2504 can be created for APU 2516. For there to be separate threads, there must be no dependency (that a further action of a first actor is dependent upon the actions of a second actor). Breaking any dependency between application 2502 and voice recognition engine 2504 and APU 2516 allows application 2502 and voice recognition engine 2504 to operate in parallel with APU 2516. In one exemplary embodiment, a dependency between application 2502 and voice recognition engine 2504 on one hand and APU 2516 on the other can be avoided through the use of frames, e.g., lasting approximately 10-12 ms (although the invention is not limited to this embodiment). For example, while the application 2502 is using the senone score for frame n, APU 2516 can be performing a senone score for frame n+1.

More specifically, a voice recognition operation requires two discrete operations: scoring and searching. As described above, the scoring operation involves a comparison between Gaussian probability distribution vectors of a senone with the feature vector corresponding to a specific frame. In an embodiment, software stack 2500 can be configured such that these two operations occur in parallel. In particular, as shown in FIG. 22, voice recognition engine 2214 can include search thread 2250 and distance thread 2260. Distance thread 2260 can manage distance calculations completed on APU 2220 and search thread 2250 can use the results of the distance calculations to determine which sound was received (e.g., by searching a library of senone scores to determine the best match). By setting distance thread 2260 to a higher priority than search thread 2250, distance thread 2260 can perform the operations needed to start the scoring operation on APU 2220. The distance thread 2260 can then be put to sleep. While asleep, search thread 2250 can be activated and can search using the results of the last distance operation. Because the length of time needed to complete a distance computation is relatively predictable, distance thread can be put to sleep for a predetermined amount of time. In alternative embodiments, distance thread 2260 can be put to sleep indefinitely and an interrupt from APU 2220 can instead be used to wake up distance thread 2260. In doing so, APU 2220 can be used to compute a distance score for a frame n+1, while CPU 2210 performs a searching operation using the previously calculated score for frame n.

Figure 26:
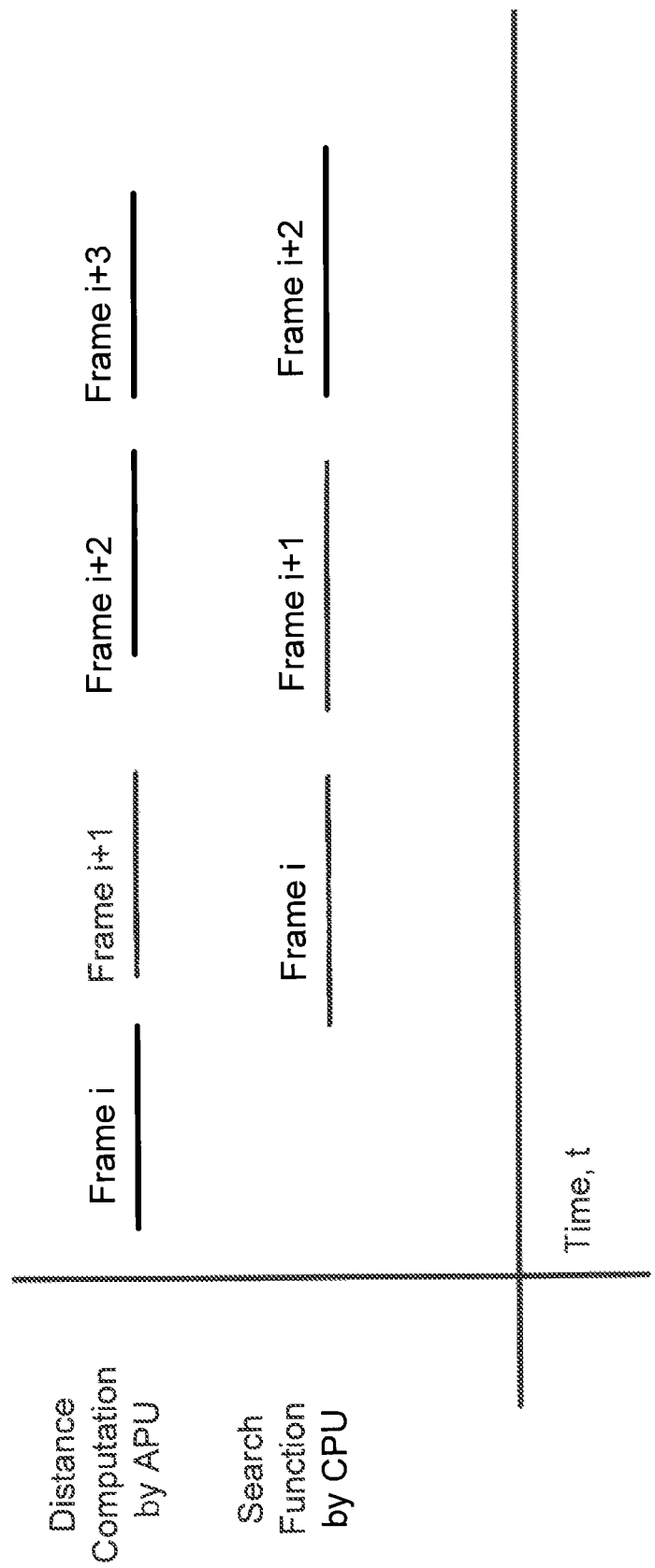
FIG. 26 is an illustration of an embodiment of concurrent processing.

For any given frame, the search can follow the distance computation as illustrated in FIG. 26. In particular, the distance computation for frame (i+1) can be performed while the search for frame i is being conducted. Thus, as shown in FIG. 26, the distance computation performed by the APU can be performed concurrently with the search function performed by the CPU. In an embodiment, a call sequence to the DCA library is arranged to effect this operation. In a further embodiment, the Generic DCA is implemented so that the concurrency of the search computation and the distance computation is maximized. In an embodiment, an implementation of the Generic DCA library uses the API proved by the APU library.

Figure 27:
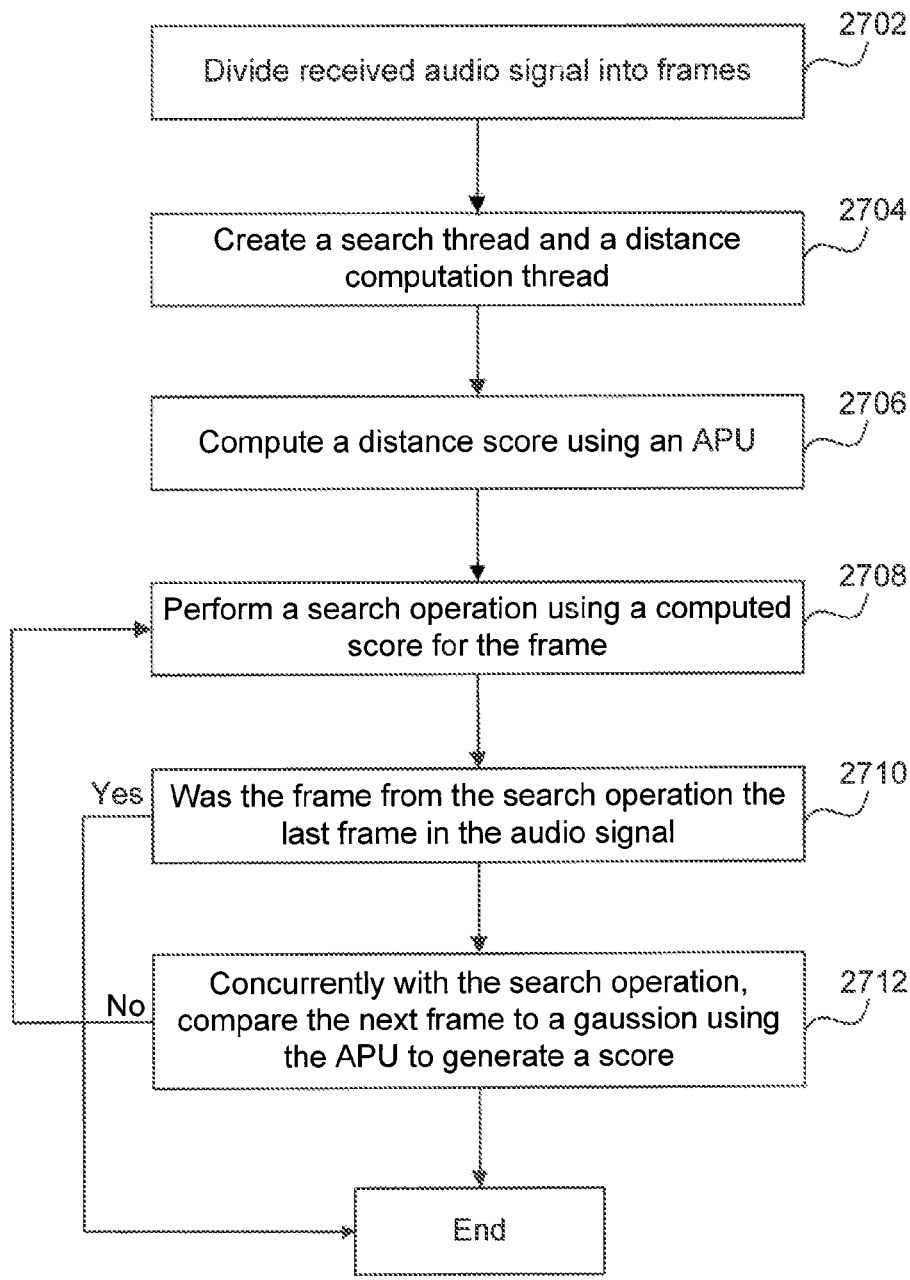
FIG. 27 is an illustration of an embodiment of a method of acoustic processing.

FIG. 27 is an illustration of an embodiment of a method 2700 for acoustic processing. The steps of method 2700 can be performed using, for example, acoustic processing system 2200, shown in FIG. 22, along with software stack 2500, shown in FIG. 25.

In step 2702, the received audio signal is divided into frames. For example, in FIG. 22, voice recognition engine 2214 can divide a received audio signal into frames that are, for example, 10-12 ms in length.

In step 2704, a search thread and a distance computation thread are created. For example, in FIG. 22, voice recognition engine 2214 can create search thread 2250 and distance thread 2260.

In step 2706, a distance score is computed using an APU. For example, in FIG. 22, at the direction of distance thread 2260, senone scoring unit 2230 of APU 2220 can compute a distance score between a feature vector corresponding to a frame and a Gaussian probability distribution vector.

In step 2708, a search operation is performed using the computed score for the frame. For example, in FIG. 22, search thread 2250 can use the distance score computed in step 2706 to search different senones to determine which sound was included in the frame.

In step 2710, it is determined whether the frame was the last frame of the audio signal. If so, method 2700 ends. If not, method 2700 proceeds to step 2712.

In step 2712, concurrently with the search operation of step 2708, a distance score for the next frame is computing using the APU. For example, in FIG. 22, APU 2220 can be used to compute a distance score for a frame i+1 concurrently with search thread 2250 performing a search operation using the distance score for frame i.

7. Exemplary Computer System

Figure 28:
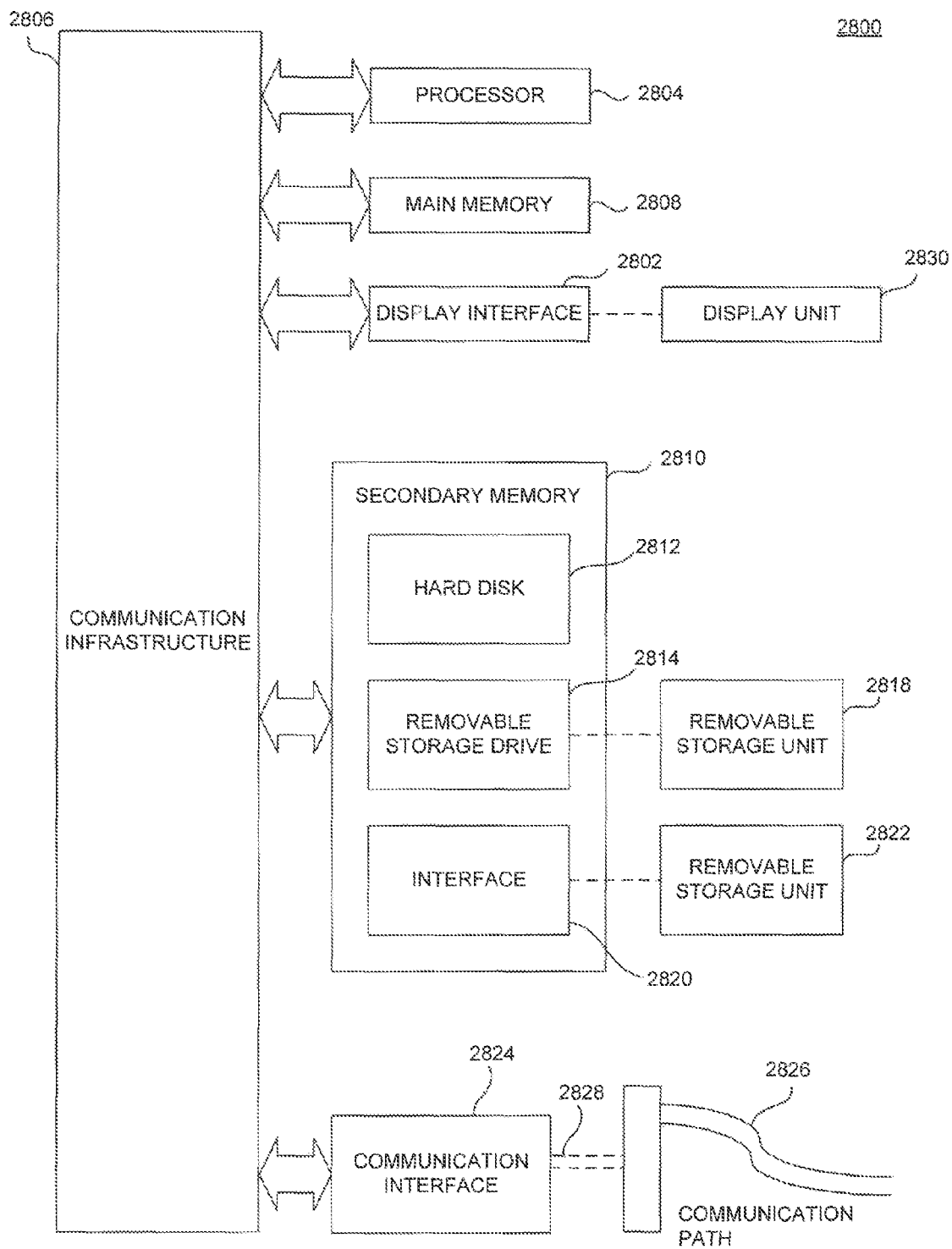
FIG. 28 is an illustration of an embodiment of an example computer system in which embodiments of the present invention, or portions thereof, can be implemented as computer readable code.

Various aspects of the present invention may be implemented in software, firmware, hardware, or a combination thereof FIG. 28 is an illustration of an example computer system 2800 in which embodiments of the present invention, or portions thereof, can be implemented as computer-readable code. For example, the method illustrated by flowchart 900 of FIG. 9, the method illustrated by flowchart 1700 of FIG. 17, the method illustrated by flowchart 2100 of FIG. 21, software stack 2500 illustrated in FIG. 25, and/or the method illustrated by flowchart 2700 of FIG. 27 can be implemented in system 2800. Various embodiments of the present invention are described in terms of this example computer system 2800. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (e.g., an APU core) that is embodied in program code and can be transformed to hardware as part of the production of integrated circuits.

Computer system 2800 includes one or more processors, such as processor 2804. Processor 2804 may be a special purpose or a general-purpose processor such as, for example, the APU and CPU of FIG. 4, respectively. Processor 2804 is connected to a communication infrastructure 2806 (e.g., a bus or network).

Computer system 2800 also includes a main memory 2808, preferably random access memory (RAM), and may also include a secondary memory 2810. Secondary memory 2810 can include, for example, a hard disk drive 2812, a removable storage drive 2814, and/or a memory stick. Removable storage drive 2814 can include a floppy disk drive, a magnetic tape drive, an optical disk drive, a flash memory, or the like. The removable storage drive 2814 reads from and/or writes to a removable storage unit 2818 in a well-known manner. Removable storage unit 2818 can comprise a floppy disk, magnetic tape, optical disk, etc. which is read by and written to by removable storage drive 2814. As will be appreciated by persons skilled in the relevant art, removable storage unit 2818 includes a computer-usable storage medium having stored therein computer software and/or data.

Computer system 2800 (optionally) includes a display interface 2802 (which can include input and output devices such as keyboards, mice, etc.) that forwards graphics, text, and other data from communication infrastructure 2806 (or from a frame buffer not shown) for display on display unit 2830.

In alternative implementations, secondary memory 2810 can include other similar devices for allowing computer programs or other instructions to be loaded into computer system 2800. Such devices can include, for example, a removable storage unit 2822 and an interface 2820. Examples of such devices can include a program cartridge and cartridge interface (such as those found in video game devices), a removable memory chip (e.g., EPROM or PROM) and associated socket, and other removable storage units 2822 and interfaces 2820 which allow software and data to be transferred from the removable storage unit 2822 to computer system 2800.

Computer system 2800 can also include a communications interface 2824. Communications interface 2824 allows software and data to be transferred between computer system 2800 and external devices. Communications interface 2824 can include a modem, a network interface (such as an Ethernet card), a communications port, a PCMCIA slot and card, or the like. Software and data transferred via communications interface 2824 are in the form of signals which may be electronic, electromagnetic, optical, or other signals capable of being received by communications interface 2824. These signals are provided to communications interface 2824 via a communications path 2826. Communications path 2826 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 2818, removable storage unit 2822, and a hard disk installed in hard disk drive 2812. Computer program medium and computer-usable medium can also refer to memories, such as main memory 2808 and secondary memory 2810, which can be memory semiconductors (e.g., DRAMs, etc.). These computer program products provide software to computer system 2800.

Computer programs (also called computer control logic) are stored in main memory 2808 and/or secondary memory 2810. Computer programs may also be received via communications interface 2824. Such computer programs, when executed, enable computer system 2800 to implement embodiments of the present invention as discussed herein. In particular, the computer programs, when executed, enable processor 2804 to implement processes of embodiments of the present invention, such as the steps in the method illustrated by flowchart 900 of FIG. 9 and flowchart 1700 of FIG. 17, the method illustrated by flowchart 2100 of FIG. 21, the method illustrated by flowchart 2700 of FIG. 27, and or the functions in software stack 2500 illustrated in FIG. 25 can be implemented in system 2800, discussed above. Accordingly, such computer programs represent controllers of the computer system 2800. Where embodiments of the present invention are implemented using software, the software can be stored in a computer program product and loaded into computer system 2800 using removable storage drive 2814, interface 2820, hard drive 2812, or communications interface 2824.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

8. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

Embodiments of the present invention have been described above with the aid of functional building blocks illustrating the implementation of specified functions and relationships thereof, The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An arithmetic logic unit for computing a one-dimensional score between a feature vector and a Gaussian probability distribution vector, comprising:
    a computational logic unit configured to compute a first value based on a mean value and a variance value associated with a dimension of the Gaussian probability distribution vector and a dimension of a feature vector;
    a look up table module configured to output a second value based on the variance value; and
    a combination module configured to combine the first value and the second value to generate the one-dimensional score.

2. The arithmetic logic unit of claim 1, wherein the first value and the second value are represented using a same number of bits.

3. The arithmetic logic unit of claim 1, wherein the computational logic unit comprises a subtraction module configured to compute the difference between the one-dimension value of the feature vector and the mean value and wherein the difference is positive.

4. The arithmetic logic unit of claim 3, wherein the computational logic unit further comprises a look up table configured to output a third value based on the variance value.

5. The arithmetic logic unit of claim 4, wherein the computational logic unit is configured to compute the first value as a product of a square of the difference and the third value.

6. The arithmetic logic unit of claim 1, wherein the computational logic unit comprises an exception handling module configured to output the first value for specific values of the mean value, the variance value, and the dimension of the feature vector.

7. The arithmetic logic unit of claim 1, wherein the computational logic unit comprises a feature vector transformation module configured to scale the dimension of the feature vector by a scaling factor.

8. The arithmetic logic unit of claim 1, wherein the combination module comprises:
   an adder configured to compute a sum of the first and second values; and
   a shift module configured to shift the sum such that 0 bits are present right of a decimal point of the sum.

9. The arithmetic logic unit of claim 1, wherein the lookup table module comprises a look up table configured to output a value $\text{lut}_{ij}$ given by $$\text{lut}_{ij} = (\ln(\text{var}_{ij}) - C) \times M_1,$$

where:
   $\text{var}_{ij}$, is the variance value of the $i^{th}$ dimension of the $j^{th}$ Gaussian probability distribution vector; and
   $M_1$ is a scaling factor; and
   $C$ is a constant.

10. The arithmetic logic unit of claim 1, wherein the first value is given by:

$$\left((x_i - \mu_{ij}) \times \left(\frac{1}{\text{var}_{ij}}\right)\right)^2 \times M_2,$$

where
   $x_i$ is the value of the $i^{th}$ feature vector dimension,
   $\mu_{ij}$ is the mean value of the $i^{th}$ dimension of the $j^{th}$ Gaussian probability distribution vector;
   $\text{var}_{ij}$, is the variance value of the $i^{th}$ dimension of the $j^{th}$ Gaussian probability distribution vector; and
   $M_2$ is a weighting factor.

11. A method of computing a one-dimensional distance score between a feature vector and a Gaussian probability distribution vector, comprising:
   computing a first value based on a mean value and a variance value associated with a dimension of the Gaussian probability distribution vector and a dimension of a feature vector;
   retrieving a second value based on the variance value from a look up table module; and
   combining the first value and the second value to generate the one-dimensional score; and
   wherein at least one of the computing, retrieving, and combining are performed by one or more computers.

12. The method of claim 11, wherein the computing comprises:
   computing a difference between the dimension of the feature vector and the mean value.

13. The method of claim 12, wherein the computing comprises retrieving a third value from a second look up table based on the variance value.

14. The method of claim 13, wherein the computing comprises computing the first value as a product of a square of the difference and the third value.

15. The method of claim 11, further comprising, before the computing, transforming the value of the feature vector module for that dimension using a scaling factor.

16. The method of claim 11, wherein the lookup table module comprises a look up table configured to output a value $\text{lut}_{ij}$ given by $$\text{lut}_{ij} = (\ln(\text{var}_{ij}) - C) \times M_1,$$

where:
   $\text{var}_{ij}$, is the variance value of the $i^{th}$ dimension of the $j^{th}$ Gaussian probability distribution vector;
   $M_1$ is a scaling factor; and
   $C$ is a constant.

17. The method of claim 11, wherein the first value is given by:

$$\left((x_i - \mu_{ij}) \times \left(\frac{1}{\text{var}_{ij}}\right)\right)^2 \times M_2,$$

where:
   $x_i$ is the value of the $i^{th}$ feature vector dimension,
   $\mu_{ij}$ is the mean value of the $i^{th}$ dimension of the $j^{th}$ Gaussian probability distribution vector;
   $\text{var}_{ij}$, is the variance value of the $i^{th}$ dimension of the $j^{th}$ Gaussian probability distribution vector; and
   $M_2$ is a weighting factor.

* * * * *